(12) United States Patent
Heggelund et al.

(10) Patent No.: US 10,733,782 B2
(45) Date of Patent: Aug. 4, 2020

(54) GRAPHICS PROCESSING SYSTEMS

(71) Applicant: Arm Limited, Cambridge (GB)

(72) Inventors: Frode Heggelund, Trondheim (NO); Andreas Due Engh-Halstvedt, Trondheim (NO); Christian Vik Grovdal, Trondheim (NO)

(73) Assignee: Arm Limited, Cambridge (GB)

( * ) Notice: Subject to any disclaimer, the term of this patent is extended or adjusted under 35 U.S.C. 154(b) by 7 days.

(21) Appl. No.: 16/153,359

(22) Filed: Oct. 5, 2018

(65) Prior Publication Data

US 2020/0111247 A1 Apr. 9, 2020

(51) Int. Cl.
*G06T 15/00* (2011.01)
*G06T 1/20* (2006.01)
*G06T 15/40* (2011.01)

(52) U.S. Cl.
CPC .............. *G06T 15/005* (2013.01); *G06T 1/20* (2013.01); *G06T 15/405* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 2013/0076762 A1* | 3/2013 | Heggelund | G06T 1/20 345/502 |
| 2014/0168220 A1* | 6/2014 | Nystad | G06T 15/40 345/421 |
| 2014/0267377 A1* | 9/2014 | Halstvedt | G06T 11/40 345/613 |
| 2017/0337656 A1* | 11/2017 | Vembu | G06T 1/20 |
| 2018/0144538 A1* | 5/2018 | Jeong | G06T 11/001 |

* cited by examiner

*Primary Examiner* — YuJang Tswei
(74) *Attorney, Agent, or Firm* — Vierra Magen Marcus LLP

(57) ABSTRACT

To perform a graphics processing operation for the entirety of an area of a render output being generated by a graphics processor, a command to draw a primitive occupying the entire area of the render output is issued to the graphics processor. The graphics processor draws the primitive by determining the vertices to use for the primitive from the area of the render output. In a tile-based graphics processor at least, the graphics processor in an embodiment also determines whether it is unnecessary to process the graphics processing command for a rendering tile and when it is determined that processing the graphics processing command for the rendering tile is unnecessary, the graphics processor omits processing the graphics processing command for the rendering tile.

23 Claims, 6 Drawing Sheets

{
1. Clear stencil buffer (C1)
2. Draw stencil mask for object 1 (S1)
3. Draw object 1 masked with S1 (O1)
4. Clear stencil buffer (C2)
5. Draw stencil mask for object 2 (S2)
6. Draw object 2 masked with S2 (O2)
}

| | A1 | A2 | A3 | B1 | B2 | B3 | C1 | C2 | D1 | D2 |
|---|---|---|---|---|---|---|---|---|---|---|
| C1 | (V) | V | (V) | V | V | V | V | V | (V) | V |
| S1 | – | – | – | V | V | V | V | V | – | – |
| O1 | – | V | – | V | V | – | – | V | – | V |
| C2 | V | [V] | V | V | V | V | V | V | V | [V] |
| S2 | – | – | – | – | – | – | V | V | V | V |
| O2 | – | V | V | – | V | V | V | V | V | V |

GRAPHICS PROCESSING SYSTEMS

BACKGROUND

The technology described herein relates to graphics processing systems, and in particular to tile-based graphics processing systems.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates in order to generate the desired render output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

FIG. 1 shows a typical computer graphics processing system, comprising a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 will send appropriate commands and data to a driver 4 for the graphics processor 3 that is running on the host processor 1.

The driver 4 will then send appropriate commands and data to the graphics processor 3 to cause it to generate the render output required by the application 2. The driver 4 sends commands and data to the graphics processor 3 by writing to data structures 6 in the memory 5, which data structures 6 are then read by the graphics processor 3.

The commands and data provided by the driver 4 will include commands to "draw" primitives to be rendered for the render output to be generated by the graphics processor 3, together with associated vertex data representing the vertices to be used for the primitives for the render output.

The commands sent to the graphics processor 3 cause the graphics processor 3 to read and process the vertex data to generate the render output. The graphics processor 3 will typically use the vertex data for a primitive to rasterise the primitive to one or more fragments each (potentially) applying to a region (area) of the render output. The fragments will then be rendered.

The completed render output (e.g. frame) may be written in a frame buffer 7 in the memory 5, from where it may be provided for display on a display device, such as a screen or printer.

Some graphics processing systems use so-called "tile-based" rendering. In tile-based rendering, the two-dimensional render output (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete render output (e.g. frame for display). In such arrangements, the render output is typically divided (by area) into regularly-sized and shaped rendering tiles (they are usually e.g., squares or rectangles).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This can allow the overall amount of graphics processing necessary for a given render output to be reduced.

The Applicants have recognised that it may be desirable to perform a graphics processing operation for the entirety of a render output (e.g. frame) being generated. For example, when performing a stencil operation it may be desirable to first clear the stencil buffer for the entire render output (frame).

The Applicants further believe that there remains scope for improvements to performing graphics processing operations for an entire render output, particularly in the case of tile-based graphics processing systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
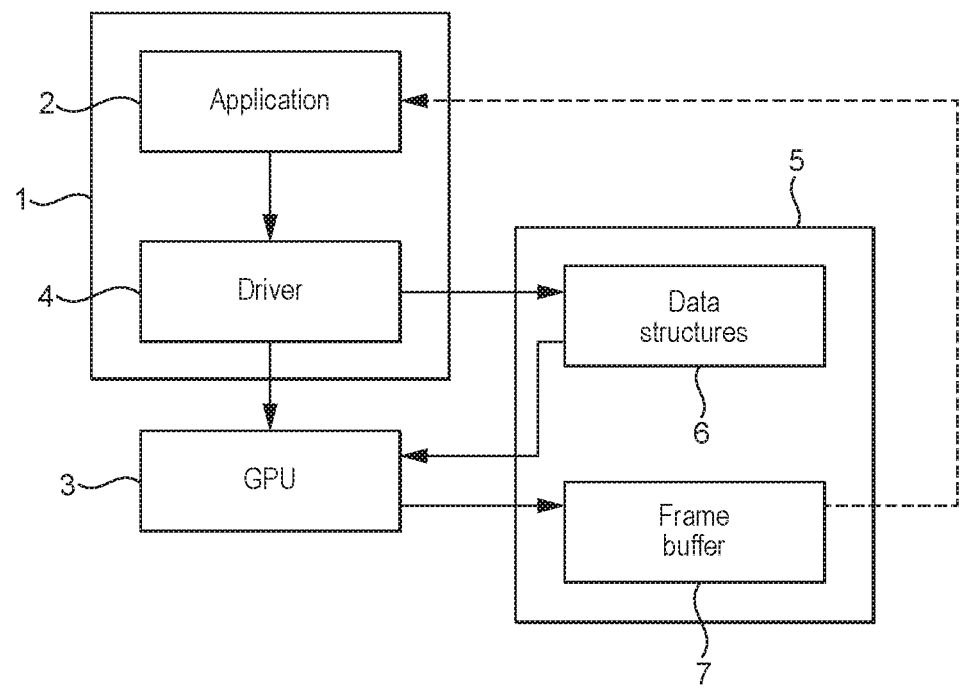
FIG. 1 shows an exemplary graphics processing system which may be operated in accordance with an embodiment of the technology described herein.

A first embodiment of the technology described herein comprises a method of operating a graphics processing system comprising a graphics processor, the method comprising:

when it is desired to perform a graphics processing operation for the entirety of the area of a render output that is being generated by the graphics processor:
issuing, to the graphics processor, a command to draw a primitive that occupies the entirety of the area of the render output and to perform the graphics processing operation for the primitive, and in response to which command, the graphics processor will determine the vertices for the primitive from the area of the render output; and the graphics processor in response to the command:
determining the vertices for the primitive to be drawn in response to the command from the area of the render output;
drawing the primitive using the determined vertices so as to occupy the entirety of the area of the render output; and
performing the graphics processing operation defined for the command for the primitive.

A second embodiment of the technology described herein comprises a graphics processing system comprising command issuing circuitry and a graphics processor;
wherein the command issuing circuitry is configured to:
when it is desired to perform a graphics processing operation for the entirety of the area of a render output that is being generated by the graphics processor:
issue, to the graphics processor, a command to draw a primitive that occupies the entirety of the area of the render output and to perform the graphics processing operation for the primitive, and in response to which command, the graphics processor will determine the vertices for the primitive from the area of the render output; and
the graphics processor is configured to, in response to a command to draw a primitive that occupies the entirety of the area of the render output and to perform a graphics processing operation for the primitive:
determine the vertices for the primitive to be drawn in response to the command from the area of the render output;
draw the primitive using the determined vertices so as to occupy the entirety of the area of the render output; and
perform the graphics processing operation defined for the command for the primitive.

The technology described herein is concerned with performing graphics processing operations for the entirety of the area of a render output being generated (rendered). Thus, the technology described herein is concerned with performing "full-frame" graphics processing operations, that affect the entire area of the frame being rendered.

In the technology described herein such a "full-frame" graphics processing operation is triggered by issuing a specific, "full-frame", command to the graphics processor which instructs the graphics processor to draw a primitive occupying (covering) the entirety of the area of the render output being rendered, a "full-frame" primitive, and to perform the graphics processing for the so-drawn "full-frame" primitive (and so for the entirety of the area of the render output (frame) being generated).

Furthermore, in the technology described herein, the graphics processor is configured to, in response to receiving the "full-frame" command, determine the vertices for the "full-frame" primitive from the area of the render output (frame), and draw the "full-frame" primitive using the so-determined vertices.

This means that the vertices for the "full-frame" primitive do not need to be (and are not) explicitly specified in the command and any associated data sent to the graphics processor, but are instead, in effect, "implicit" to the "full-frame" command itself.

Thus, in the technology described herein, instead of, e.g., the graphics processor determining vertices to use for the "full-frame" primitive from vertex data that is supplied to the graphics processor by a host processor, and that is, e.g., stored in, and read by the graphics processor from, memory, the graphics processor determines the vertices from (based on) the area of the render output.

Thus, for example, where the render output is a frame to be displayed, the graphics processor can determine the vertices for the "full-frame" primitive from the area of the frame. For example, where (as will typically be the case) the frame is a rectangular or square area, the vertices for the "full-frame" primitive may (be determined by the graphics processor to) correspond to the four corners of the frame.

The Applicants have recognised that since the vertices of a "full-frame" primitive occupying the entirety of the area of the render output (frame) being generated should correspond to the vertices (corners) of the render output (frame) being generated, a command to the graphics processor to draw such a "full-frame" primitive does not need to "explicitly" define or refer to vertex positions for the "full-frame" primitive in order for the graphics processor to be able to draw the "full-frame" primitive.

Thus, the "full-frame" command of the technology described herein does not refer explicitly to vertex data. Correspondingly, issuing the "full-frame" command to draw the "full-frame" primitive to the graphics processor should be (and in an embodiment is) performed without writing vertex data associated with (and defining the vertices of) the "full-frame" primitive to (the) memory. Correspondingly, the graphics processor, in response to the "full-frame" command, determines the vertex positions for the "full-frame" primitive from (based on) the area of the render output (frame) rather than from explicitly indicated vertex data (read from (the) memory).

The technology described herein accordingly allows the performance of a graphics processing operation for the entirety of a render output without the need to read (and without reading) vertex data from memory. Accordingly, the requirements for reading and writing vertex data where a "full-frame" operation is to be performed can be avoided, and moreover, generation of the vertex data in the first place can be avoided.

The technology described herein can thus reduce memory traffic (bandwidth) and usage, and accordingly power usage, when performing graphics processing operations for an entire render output. This is generally beneficial, but may be particularly advantageous for graphics processors that are to be used in low power and portable devices.

It will be appreciated, therefore, that the technology described herein provides an improved graphics processing system. Moreover, and as will be become apparent from the following, the technology described herein becomes particularly advantageous in the context of a tile-based graphics processing system.

The graphics processor may be any suitable and desired processor, e.g. and in an embodiment a graphics processing unit (GPU). The graphics processor should be operable to process graphics processing commands (including the "full-frame" command) (and data) to generate (render) a render output (frame).

In an embodiment, the graphics processor is a tile-based graphics processor (and the graphics processing system is a tile-based graphics processing system), and the render output (area) is accordingly divided into plural rendering tiles for rendering purposes (is processed on a tile-by-tile basis (by the graphics processor)).

The render output can be any suitable and desired render output to be generated (rendered) by the graphics processor. The render output to be generated (rendered) by the graphics processor may typically be a frame intended for display on a display device, such as a screen or printer, but may also, for example, comprise intermediate data intended for use in later rendering passes (also known as a "render to texture" output), etc.

The render output will typically be represented as a rectangular array of data elements (pixels), e.g. representing an image, wherein generating (rendering) the render output includes the graphics processor determining the colour (or greyscale) value to be used for each data element (pixel) of the render output (frame).

The tiles that the render output may be divided into for rendering purposes can be any suitable and desired such tiles. The size and shape of the rendering tiles may normally be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment square or rectangular. The size and number of tiles can be selected as desired. In an embodiment, each tile is 16×16, or 32×32 data elements (pixels) in size (with the render output then being divided into however many such tiles as are required for the render output size and shape that is being used).

Graphics processing commands (including the "full-frame" command) (and data) may be issued to the graphics processor in any suitable and desired manner.

In an embodiment, the graphics processing system includes a, e.g. host, processor which issues graphics processing commands (including the "full-frame" command) (and data) to the graphics processor. The, e.g. host, processor can be any suitable and desired processor, such as and in an embodiment a central processing unit (CPU), of the graphics processing system.

In an embodiment, the, e.g. host, processor of the graphics processing system generates the graphics processing commands (including the "full-frame" command) (and data) for the graphics processor in response to instructions from an application executing on the processor. This is in an embodiment done by a driver for the graphics processor that is executing on the, e.g. host, processor.

In an embodiment, graphics processing commands (including the "full-frame" command) (and data) are written to memory, e.g. by the driver, and the graphics processor then reads the graphics processing commands (including the "full-frame" command) (and data) therefrom.

The memory can be any suitable and desired storage. The memory may be an on-chip memory (i.e. on the same chip as the, e.g. host, processor and/or CPU and/or the graphics processor) or it may be an external (main) memory (i.e. not on the same chip as the, e.g. host, processor and/or the graphics processor). Where the memory is an external memory, it may be connected to the, e.g. host, processor and/or to the graphics processor by a suitable interconnect.

The "full-frame" command is issued to the graphics processor when it is desired to perform a graphics processing operation for the entirety of the area of the render output. In an embodiment, the, e.g. host, processor (e.g. the driver for the graphics processor) recognises when a graphics processing operation for the entirety of the area of the render output is to be performed (e.g. when the application has so requested), and when it is recognised that a graphics processing operation for the entirety of the area of the render output is to be performed, issues a "full-frame" command to the graphics processor accordingly.

The "full-frame" command that is issued to the graphics processor is a command that triggers the graphics processor to draw a primitive occupying the entirety of the area of the render output, and to perform a graphics processing operation for that "full-frame" primitive.

The "full-frame" command will typically be included in a sequence of plural graphics processing commands issued to the graphics processor to cause the graphics processor to generate (render) a desired render output (e.g. frame). The sequence of plural graphics processing commands issued to the graphics processor to generate (render) the render output may include one or more instances of a "full-frame" command.

Thus, in an embodiment, a sequence of plural graphics processing commands that includes one or more instances of a "full-frame" command to draw (one or more instances of) a "full-frame" primitive occupying the entire area of the render output is issued to the graphics processor to generate (render) the render output, together with one or more other commands to draw one or more other primitives. The one or more other primitives will typically not occupy the entire area of the render output, but may each occupy some but not all of the area of the render output.

To facilitate the rendering operation, the graphics processing commands (and data) to be processed for the render output (including any "full-frame" commands) may be organised into distinct draw calls, wherein the draw calls for the render output are processed in turn to generate the render output.

As discussed above, the data associated with a (and each) command to draw a primitive issued to the graphics processor (other than a "full-frame" command in the manner of the technology described herein) will typically also include vertex data defining the vertices of the respective primitive to draw. In contrast, (each instance of) a "full-frame" command should not be (and in an embodiment is not) associated with vertex data defining the vertices of the "full-frame" primitive.

The "full-frame" command of the technology described herein triggers the graphics processor to draw a "full-frame" primitive. The command can indicate this is any suitable and desired manner, such as by having a particular command identifier that the graphics processor interprets accordingly. For example, the driver for the graphics processor can generate an appropriate "full-frame" job descriptor and issue that descriptor for processing by the graphics processor.

As well as indicating a "full-frame" primitive operation, the "full-frame" command also triggers the graphics processor to perform a desired graphics processing operation for the entirety of the render output (for the "full-frame" primitive).

This can be done in any suitable and desired manner. In an embodiment, the graphics processing operation is indicated by configuration (state) data that is associated with the "full-frame" command, such as, and in an embodiment, a draw call descriptor (DCD) for the draw call being processed.

Thus, in an embodiment, a (and each) command is associated with configuration data (state data) for configuring the graphics processor to perform the desired graphics processing operation for the (respective) "full-frame" primitive.

In an embodiment, the configuration data (state data) (for a "full-frame" command) is issued to the graphics processor by the, e.g. host, processor (along with the respective command(s)), in an embodiment by the e.g. driver for the graphics processor running on the, e.g. host, processor writing the configuration data (state data) to (the) memory, with the graphics processor then reading the configuration data (state data) from the memory.

The configuration data (state data) may be associated with a "full-frame" command in any suitable and desired manner. In an embodiment, (each instance of) the "full-frame" command comprises information indicative of the (respective) configuration data (state data) (stored in (the) memory). For example, and in an embodiment, (each instance of) the "full-frame" command includes an index or pointer indicative of (respective) configuration data (state data) (e.g. stored in (the) memory).

Thus, in an embodiment, the graphics processor reads the "full-frame" command (from (the) memory), then reads configuration data (state data) (from (the) memory) according to information indicative of the location of the configuration data (state data) included in the read "full-frame" command, and then performs the graphics processing operation for the "full-frame" primitive according to the read configuration data.

The "full-frame" primitive that the "full-frame" command instructs the graphics processor to draw occupies the entirety of the area of the render output (e.g. frame) (occupies the entirety of the area corresponding to each data element (sampling position) of the render output), but can otherwise be any suitable and desired primitive. This may depend, e.g., upon the shape and configuration of the render output that is being generated.

Where (as will typically be the case) the render output (frame) corresponds to a rectangular (including square) area, the "full-frame" primitive will be (and is in an embodiment) defined by four vertices: one vertex at each of the four corners of the rectangle (e.g. square). Other arrangements would be possible.

Drawing the "full-frame" primitive can be performed in any suitable and desired manner which includes the graphics processor determining the vertices for the "full-frame" primitive from the area of the render output (frame). The vertices for the "full-frame" primitive are determined by the graphics processor from the area (the (two-dimensional) size (and position)) of the render output (e.g. frame), but can otherwise be determined in any suitable and desired manner.

The graphics processor may explicitly determine the vertices for the "full-frame" primitive, e.g. by assessing the area (the (two-dimensional) size (and position)) of the render output (frame), and assigning vertices to appropriate extremities (vertices) of the render output, e.g. one vertex at each of the four corners of the render output. Where the render output is a frame to be displayed, the graphics processor may assess the area of the frame based on the defined area of the frame buffer that is storing the frame.

In an embodiment, the graphics processor reads width and height values of the render output (target) (e.g. frame), in an embodiment from a descriptor (state information) for the render output (e.g. a "Frame Buffer Descriptor"), e.g. stored in (the) memory, and then determines the vertices for the "full-frame" primitive (and draws the "full-frame" primitive) using the read width and height values. For example, and in an embodiment, the graphics processor sets the coordinates of one vertex of the "full-frame" at one corner of the render output (frame), and determines the coordinates of other vertices of the "full-frame" primitive by adding or subtracting width and/or height values as appropriate.

Once the vertices for the "full-frame" primitive have been determined, the graphics processor draws the "full-frame" primitive and performs the graphics processing operation for the primitive. This can be done in any suitable and desired manner.

In an embodiment, the "full-frame" primitive is first subjected to a triangle (primitive) set up operation (in an embodiment in a triangle set up unit) that uses the determined vertices for the full-frame primitive to generate barycentric functions for varying interpolation, and in an embodiment, a set of edge functions for the primitive. In an embodiment, both barycentric functions and edge functions are generated, although the edge functions need not be generated from the vertices, if desired, as because the "full-frame" primitive edge completely covers the render output, edge functions may not strictly be needed, or can be anything that covers the entire frame as the area outside the frame will not be subdivided anyway.

The triangle set up process (triangle set up unit) is in an embodiment able to run a respective, different, triangle set up process (program) for each specific primitive type, so, accordingly, in an embodiment, a distinct triangle set up process (program) is defined for a "full-frame" primitive that is executed in response to receiving a "full-frame" command (primitive) for processing.

The graphics processing and processor in an embodiment then rasterises the "full-frame" primitive to graphics fragments, and then performs the graphics processing operation for the graphics fragments.

The (rasteriser of the) graphics processor, should, and in an embodiment does rasterise the "full-frame" primitive to generate graphics fragments covering the entire of the area of the render output.

In an embodiment, the (rasteriser of the) graphics processor is configured to perform so-called "hierarchical" rasterisation. Thus, in an embodiment, the (rasteriser of the) graphics processor is configured to rasterise primitives, including a "full-frame" primitive, by testing larger patches of the render output to be generated against the primitive to be rasterised, to determine if the primitive covers (at least in part) any smaller patches of the render output that the larger patch encompasses. If the primitive does cover (at least in part) any smaller patches of the render output that the larger patch encompasses, then the larger patch is sub-divided into those smaller patches, and the process is then repeated for each smaller patch of the render output that was found to be at least partially covered by the primitive.

In this way, the rasterisation process operates to iteratively test the primitive against progressively smaller patches of the render output. A fragment or fragments is then generated for rendering for patches of sampling points found to be covered at least in part by the primitive in question.

In such an arrangement, a "full-frame" primitive of the technology described herein can be handled in the same way, but in an embodiment, where hierarchical rasterisation is used, the rasteriser generates fragments for the "full frame" primitive in respect of the largest tested patch immediately without subdividing that patch into smaller patches (for testing) (since it is known that the "full frame" primitive will cover all of the render output area.

The graphics processing operation that the "full-frame" command instructs the graphics processor to perform for the "full-frame" primitive occupying the entirety of the area of the render output can be any suitable and desired graphics processing operation.

The graphics processing operation should be an operation that it is desired to perform for the entirety of the area of the render output. Thus, the graphics processing operation should be a graphics processing operation that has (or at least has the potential to have) an effect in respect of the entire area of the render output.

The graphics processing operation can (directly) affect (e.g. write to) data elements values of the render output. Alternatively, the graphics processing operation can affect data values associated with the render output, but which are not the render output itself, such as depth values and/or stencil values and/or other values that the graphics processor uses to generate the render output. (In such embodiments, the graphics processing operation accordingly will indirectly affect the render output.)

In an embodiment, the graphics processing operation is a graphics processing operation for the entire area of the render output, which if repeated, would produce the same result (in respect of each data element of the entire render output) as performing only a single instance of the graphics processing operation. In other words, performing the graphics processing operation two or more times in a row would produce the same output result as performing the graphics processing operation only a single time.

In an embodiment, the graphics processing operation is an operation that sets the value for each data element for a target area corresponding to the entire area of the render output to a respective selected, in an embodiment predetermined, value. The graphics processing operation may set the data elements for the target area to different values to each other, or may set each data element for the target area to the same value (as the value for each other data element).

The graphics processing operation may be an operation which sets data values for the render output. For example, and in an embodiment, the graphics processing operation may set each data element value of the render output, for example by writing (drawing) to each data element of the render output. In one such embodiment, the graphics processing operation is a so-called "blitting" operation, in which an image is drawn across the entire render output (frame). In another embodiment, the graphic processing operation is a "clear to image" or "clear to pattern" operation in which the entire render output (frame) is cleared to a background image or pattern.

Alternatively, and in an embodiment, the graphics processing operation sets data values associated with the render output, but which are not the render output itself, in respect of the entire area of the render output (for all data elements (positions) in the render output). For example, the graphics processing operation is in an embodiment an operation which sets depth values and/or stencil values and/or other values that the graphics processor uses to generate the render output. (In such embodiments, the graphics processing operation accordingly will indirectly affect the render output.)

Thus, in an embodiment, the graphics processing operation that is performed for the "full-frame" primitive is an operation which affects (e.g. sets) depth and/or stencil and/or other values that the graphics processor uses to generate the render output for an area corresponding to the entire area of the render output.

In one such embodiment, the graphics processing operation is a "clear" operation in which depth and/or stencil values and/or other values that the graphics processor uses to generate the render output are cleared for an area corresponding to the entire area of the render output (e.g. each corresponding data element value is set to a data value which indicates that the data element is "cleared", such as zero or "NaN").

Thus, in an embodiment, the graphics processing system comprises a depth buffer for storing depth data and/or a stencil buffer for storing stencil data (in (the) memory). The depth buffer may store depth data for an area corresponding to the entirety of the area of the render output. Similarly, the stencil buffer may store stencil data for an area corresponding to the entirety of the area of the render output. The graphics processing (e.g. clear) operation may accordingly affect (clear) the entirety of the depth and/or stencil buffer.

It will be appreciated that in a tile-based graphics processing system, the depth buffer may typically store depth data for an area corresponding to a single, or a few, rendering tiles (only). Similarly, the stencil buffer may typically store stencil data for an area corresponding to a single, or a few rendering tiles (only). In these embodiments, therefore, the graphics processing (e.g. clear) operation may affect (clear) the entirety of the depth and/or stencil buffer in respect of each rendering tile that the render output has been divided into.

In another embodiment, the graphics processing operation is a background loading operation, in which a background image or pattern for the entire render output is loaded. In this case, it may be unnecessary to repeat loading the same background image or pattern in respect of some rendering tiles, for example in the case that "clear to background" graphics processing operations are being performed.

In another embodiment, the graphics processing operation is a graphics processing operation for the entire area of the render output, which if repeated, would produce an undesired result. In other words, performing the graphics processing operation two or more times in a row would produce an undesired result, whereas performing the graphics processing operation only once produces a desired result.

For example, and in an embodiment, the graphics processing operation is a "full-frame" filtering or other operation which it is desired to perform only once in respect of previously drawn data. For example, where some rendering tiles of a filtered render output are overwritten and others are not, it may be desired to re-apply the "full-frame" filter operation to the overwritten rendering tiles, but not to the other tiles to which the filter has already been applied.

As already mentioned, in a tile-based graphics processing system, the graphics processing operation is performed on a tile-by-tile basis. Thus the technology described herein, in this case will comprise the graphics processor processing the "full-frame" command (and performing the graphics processing operation) on a tile-by-tile basis.

In an embodiment, tile-by-tile processing is achieved by the use of so-called "primitive lists". Thus, in an embodiment, the graphics processing system (e.g. the host processor and/or driver for the graphics processor and/or graphics processor) is operable to arrange graphics processing commands (to draw primitives) (including the "full-frame" command) (and data) for processing (in respect of a (or each) draw call) into lists representing different sub-regions of the render output. Each such "primitive list" should indicate to the graphics processor the graphics processing commands (primitives) that are to be processed for a respective sub-region (e.g. for a respective draw call).

The individual primitive lists and the commands (primitives) in them can be arranged in any desired and suitable fashion and include any desired and suitable data. The commands (primitives) are in an embodiment listed (ordered) in each primitive list in the desired processing order (first to last).

The primitive lists may be prepared for any suitable and desired sub-regions of the render output. The (and each) sub-region may, e.g., correspond to a single rendering tile, or to a set of plural rendering tiles, as desired.

In one embodiment, primitive lists are prepared for (only) a single set of sub-regions of the render output area, with each sub-region in the set of sub-regions corresponding to the same size and shape sub-region of the render output. In an embodiment, each sub-region corresponds to a respective one of the rendering tiles that the render output has been divided into. Thus, in this case, each rendering tile will have a primitive list that is exclusive to that rendering tile prepared for it.

In another embodiment, primitive lists are prepared for two or more different sets of sub-regions of the render output, wherein each different set of sub-regions comprises different sized sub-regions to the sub-regions in the other sets of render output sub-regions for which primitive lists can be prepared.

In this case, each render output sub-region in an embodiment comprises a group of one or more contiguous rendering tiles. In an embodiment, the render output sub-regions are rectangular (including squares). In an embodiment, the render output sub-regions in a given set of render output sub-regions all have the same size, and in an embodiment also the same shape, as each other (i.e. in an embodiment cover the same number of rendering tiles).

Each set of sub-regions in an embodiment comprises sufficient sub-regions to cover (and covers) the entire render output (frame), i.e. encompass all the individual rendering tiles that the render output is divided into.

In an embodiment, the sets of sub-regions comprise one set of sub-regions in which each sub-region of the set corresponds to a respective single rendering tile (that are one (1×1) rendering tile in size), and one or more (and in an embodiment more than one) sets of sub-regions in which each sub-region of the set corresponds to (encompasses) more than one rendering tile.

In an embodiment, the sets of render output sub-regions for which primitive lists can be prepared are arranged in a hierarchical fashion, i.e. such that the number of sub-regions in each set progressively changes as one moves through the sets of sub-regions. The sets of sub-regions are in an embodiment arranged such that they effectively form a pyramidal structure as one progresses up the sets. The render output area and/or number of rendering tiles included in the sub-regions in an embodiment progressively increases as one moves up the sets of sub-regions from lowest set (which may, e.g., be, and in one embodiment is, a base, single rendering tile sub-region set).

In an embodiment, the sets of sub-regions layering hierarchy is arranged such that primitive lists can, in effect, be prepared for the entire render output, for the render output area divided into four sub-regions, for the render output area divided into 16 sub-regions, for the render output area divided into 64 sub-regions, and so on, e.g., and in an embodiment, down to its division into the individual rendering tiles.

The graphics processing commands (primitives) (in respect of a (or each) draw call) may be arranged (e.g. by the driver for the graphics processor and/or the graphics processor) into primitive lists representing different sub-regions of the render output in any suitable and desired manner.

A (and each) command to draw a primitive will typically be placed into primitive lists by processing vertex data associated with (and defining the vertices of) the primitive to determine which sub-region(s) of the render output the primitive (potentially) falls within, e.g. using exact binning, or bounding box binning.

Thus, any "full-frame" commands to draw a "full-frame" primitive could be placed into primitive lists by (e.g. the driver) processing a set of any vertices defined for the "full-frame" primitive.

However, in an embodiment, "full-frame" commands to draw a "full-frame" primitive are placed into primitive lists by the graphics processing system (e.g. the driver) recognising that the "full-frame" command applies to the entire area of the render output, and when a "full-frame" command that applies to the entire area of the render output is recognised, listing the "full-frame" command in one or more primitive lists corresponding to (that encompass) the entire area of the render output (without reading (and processing) vertex data associated with (and defining the vertices of) the "full-frame" primitive). Thus, a "full-frame" command to draw a "full-frame" primitive is in an embodiment listed in the primitive lists without needing to read (and without reading) (and process) vertex data associated with (and defining the vertices of) the "full-frame" primitive.

Thus, in the case where primitive lists are prepared for (only) a single set of sub-regions of the render output area, a "full-frame" command should be, and is in an embodiment, included in each primitive list, i.e. each sub-region that the render output has been divided into.

In the case where primitive lists are prepared for plural sets of sub-regions (in a "hierarchical" fashion), a "full-frame" command is in an embodiment listed at the "highest" level of the hierarchy and in all the lists at that level of the hierarchy (so as to encompass the entire render output area). For example, where one of the sets of sub-regions contains a single sub-region that encompasses the entire render output (which will accordingly be at the "highest" level of the hierarchy), a "full-frame" command is in an embodiment listed (once) in the primitive list for that single sub-region encompassing the entire render output.

Once all the commands (including any "full-frame" commands) have been placed into primitive lists and primitive lists have been prepared for the render output sub-regions, the rendering tiles are in an embodiment then processed and rendered, using the primitive lists to determine which commands (and primitives) need to be processed for each tile. In an embodiment, the graphics processor comprises a primitive list reading unit (circuit) configured to read the primitive lists and determine which commands to process for a rendering tile.

In an embodiment, each rendering tile is processed and rendered separately, i.e. the separate, individual tiles are rendered one-by-one (i.e. on at tile-by-tile basis). This rendering can be carried out in any desired manner, for example, by rendering the individual tiles in succession or in a parallel fashion, and storing the output for each tile, e.g., in the frame buffer (in (the) memory), e.g. for display.

Thus the technology described herein in an embodiment comprises, once the primitive lists have been prepared, processing the commands (including any "full-frame" commands) to generate the render output, on a tile-by-tile basis, (the primitive list reading circuit) using the primitive lists to determine which commands to process for each tile to be rendered (to determine which primitives should be rendered for which tiles).

As will be discussed further below, the Applicants have recognised that when performing a graphics processing operation for the entire area of a render output that is being generated on a tile-by-tile basis, it may be the case that that processing operation performed in respect of one or more of the tiles that the render output has been divided into does not in fact need to be performed.

For example, and as will be discussed further below, in the case of a stencil buffer clear operation which clears the entire stencil buffer for the entirety of the area of the render output, it may not be necessary to perform the clear operation in respect of tiles for which no stencil buffer write operations have been performed since the previous stencil buffer clear operation was performed.

Thus, in an embodiment, where the graphics processor is a tile-based graphics processor, the method comprises (and the graphics processor is correspondingly configured to) determining whether processing (executing) the "full-frame" command for a tile of the render output being processed would cause the graphics processor to perform an unnecessary graphics processing operation for that tile of the render output, and when it is determined that processing the "full-frame" command for the tile would cause the graphics processor to perform an unnecessary graphics processing operation for the tile, omitting processing (executing) the "full-frame" command for the tile. This is in an embodiment done for plural, and in an embodiment for each, of the rendering tiles that are being processed to generate the render output (that the render output has been divided into for rendering purposes).

It is believed that the idea of a graphics processor identifying appropriate opportunities for omitting the processing of "full-frame" commands in respect of a rendering tile in this manner may be novel and inventive in its own right.

Thus, a third embodiment of the technology described herein comprises a method of operating a tile-based graphics processor, in which a render output of the graphics processor is divided into plural rendering tiles for rendering purposes, and each rendering tile is generated by the graphics processor processing graphics processing commands for the respective rendering tile; the method comprising:

the graphics processor, when generating a rendering tile, in response to a graphics processing command to draw a primitive that occupies the entirety of the area of the render output and to perform a graphics processing operation for the primitive to be processed for the rendering tile:

determining whether it is unnecessary to process the graphics processing command for the rendering tile; and when it is determined that processing the graphics processing command for the rendering tile is unnecessary, omitting processing the graphics processing command for the rendering tile.

A fourth embodiment of the technology described herein comprises a tile-based graphics processor, in which a render output of the graphics processor is divided into plural rendering tiles for rendering purposes; wherein the graphics processor comprises:

rendering circuitry configured to generate each rendering by processing graphics processing commands for the respective rendering tile; and command omitting circuitry configured to, when the graphics processor is generating a rendering tile, in response to a graphics processing command to draw a primitive that occupies the entirety of the area of the render output and to perform a graphics processing operation for the primitive to be processed for the rendering tile:

determine whether it is unnecessary to process the graphics processing command for the rendering tile; and when it is determined that processing the graphics processing command for the rendering tile is unnecessary, cause the rendering circuitry of the graphics processor to omit processing the graphics processing command for the rendering tile.

As will be appreciated by those skilled in the art, these embodiments of the technology described herein can and in an embodiment do include one or more of the features of the technology described herein described herein, as appropriate.

In these embodiments, it will be appreciated the (rendering circuit of the) graphics processor should, and in an embodiment does, process (render) the "full-frame" command for the rendering tile when it is not determined that processing the "full-frame" command for the rendering tile is unnecessary (when it is determined that processing the "full-frame" command for the rendering tile is necessary).

In this case, the (rendering circuit of the) graphics processor should, and in an embodiment does, in respect of the rendering tile it is generating, draw the "full-frame" primitive and perform the "full-frame" graphics processing operation for the "full-frame" primitive, e.g. and in an embodiment in the manner as described above. The graphics processor in an embodiment also determines the vertices to use for the "full-frame" primitive from the area of the render output, e.g. as described above. Instances of a "full-frame" determined as being unnecessary to process (render) for a rendering tile, however, are not processed (rendered) by the (rendering circuit of the) graphics processor for the rendering tile.

Thus, a "full-frame" graphics processing command should be, and in an embodiment is, processed (rendered) in respect of those rendering tiles where it is not determined (it is other than) to be unnecessary to do so (where it is determined to be necessary to do so), but not in respect of those rendering tiles where it is determined to be unnecessary to do so.

Thus, in these embodiments, the total number of graphics processing operations required to perform a graphics processing operation for the entire area of a render output in a tile-based graphics processing system may be reduced. These embodiments accordingly can reduce processing, and accordingly power usage, for graphics processing operations that are to be performed for an entire render output.

The graphics processing operation may be any suitable and desired "full-frame" graphics processing operation (e.g., and in an embodiment, as described above). In an embodiment, the "full-frame" command is a command to draw a "full-frame" primitive and to perform a "full-frame" graphics processing operation for the "full-frame" primitive that sets each data element corresponding to the entire area of the render output to a respective selected, in an embodiment predetermined value. The operation may set data element values for the render output (frame), or for data element values associated with the render output (such as depth and/or stencil values and/or other values).

Thus, the graphics processing operation is in an embodiment an operation which, when repeated, produces the same result (in respect of each data element) for the entire render output, such as, and in an embodiment a "full-frame" clear operation, to e.g. clear depth values and/or stencil values for the entire render output.

Where the graphics processing operation is a graphics processing operation which if repeated, would produce an undesired result, or the same result as performing only a single instance of the graphics processing operation, the (command omitting circuit of the) graphics processor in an embodiment identifies appropriate opportunities to omit repeating the "full-frame" graphics processing operation for a rendering tile.

Thus, in an embodiment, determining whether it is unnecessary to process the "full-frame" graphics processing command for the rendering tile comprises determining whether processing the "full-frame" graphics processing command for the rendering tile would cause the graphics processor to unnecessarily or undesirably repeat the graphics processing operation for the rendering tile. In this case, it is determined that it is unnecessary to process the "full-frame" graphics processing command for the rendering tile when it is determined that processing the "full-frame" graphics processing command for the rendering tile would cause the graphics processor to unnecessarily or undesirably repeat the graphics processing operation for the rendering tile.

The Applicants have recognised that it may be undesirable or unnecessary to repeat a graphics processing command which affects each data element corresponding to the entire area of a render output in respect of one or more rendering tiles. For example, it may be unnecessary to repeatedly perform a clear operation to set each data element to a value indicating that the data element is "cleared", e.g. zero or "NaN" for a rendering tile.

For example, it may be desired to perform a series of plural stencil operations, each including a stencil clear operation for the entire area of the render output. In a tile-based graphics processing system, each such stencil operation will typically be performed by first clearing the entire stencil buffer for the particular tile that is being processed to a "cleared" state. Then, if the particular tile corresponds to an area of the render output that it is desired to stencil, writing stencil data to the stencil buffer.

If, however, the particular tile that is being processed does not correspond to an area of the render output that it is desired to stencil, then stencil data will not be written to the stencil buffer, and so the stencil buffer will remain unchanged and in the "cleared" state. In a subsequent stencil operation for that tile, therefore, clearing the stencil buffer will be unnecessary, since the stencil buffer will already be in the "cleared" state. Similarly, in the case of a depth clear operation for the entirety of the render output, or a "blitting" operation for the entirety of the render output, some tiles may undergo unnecessary graphics processing operations.

The Applicants have accordingly recognised that in a tile-based graphics processing system which is repeatedly performing a graphics processing operation that, for example, sets each data element for a target area corresponding to the entire render output to a respective selected (predetermined) value (such as a stencil clear operation), repeatedly performing such an operation will have the same effect as performing the operation only once, for rendering tiles where other commands affecting the selected (predetermined) values are not processed by the graphics processor in between. Accordingly, some rendering tiles (e.g. those tiles which correspond to areas which it is not desired to stencil) may undergo a large number of unnecessary graphics processing operations (e.g. clear operations).

Accordingly, in the present embodiments, such unnecessary operations are identified and omitted such that the number of "full-frame" commands processed (executed) by the graphics processor may be significantly reduced.

The graphics processor, (the command omitting circuit) may determine whether processing the "full-frame" graphics processing command for the rendering tile would cause the graphics processor to unnecessarily or undesirably repeat the graphics processing operation for the rendering tile in any suitable and desired manner.

In an embodiment, the graphics processor determines whether another (repeated) instance of the "full-frame" command is to be, or has been, processed for the rendering tile. (and can be omitted).

Thus, in an embodiment, determining whether it is unnecessary to process the graphics processing command for the rendering tile comprises determining whether a repeated instance of the command is to be processed for the rendering tile, wherein the command and the repeated instance of the command are to be processed for the rendering tile without an intermediate command in response to which the graphics processor will set a data element for the rendering tile to a value other than the respective selected value; and determining that it is unnecessary to process the graphics processing command for the rendering tile when it is determined that a repeated instance of the command is to be processed for the rendering tile, wherein the command and the repeated instance of the command are to be processed for the rendering tile without an intermediate command in response to which the graphics processor will set a data element for the rendering tile to a value other than the respective selected value.

This operation may be achieved in any suitable and desired manner. In an embodiment, the graphics processor comprises primitive list reading circuitry (e.g., and in an embodiment, as described above) (wherein the primitive list reading circuit comprises the command omitting circuit), and the primitive list reading circuit, in response to reading the "full-frame" graphics processing command in a primitive list for the rendering tile, determines whether a repeated instance of the "full-frame" command is to be processed for the rendering tile.

In an embodiment, the (command omitting circuit of the) graphics processor (e.g. primitive list reading circuit) does this by determining whether the next command to be processed for the rendering tile (which affects (writes to) data elements for the rendering tile) is a repeated instance of the "full-frame" command.

It is then determined that processing the "full-frame" graphics processing command for the rendering tile would cause the graphics processor to unnecessarily or undesirably repeat the graphics processing operation for the rendering tile (and so processing the "full-frame" command is unnecessary) when it is determined that the next command to be processed for the rendering tile (which affects (writes to) data elements for the rendering tile) is a repeated instance of the "full-frame" command.

In an embodiment, the graphics processor (e.g. primitive list reading circuit) only considers whether the next or previous command, immediately following or preceding the "full-frame" command, for the rendering tile is a repeated instance of the "full-frame" command (i.e. the graphics processor (e.g. primitive list reading circuit) in an embodiment determines whether the "full-frame" command is one of consecutive repeated instances of the "full-frame" command to be processed for the rendering tile (in the primitive list(s) for the rendering tile).

However, it would also be possible for the graphics processor (e.g. primitive list reading circuit) to, in effect, "ignore" any commands in between repeated instances of the "full-frame" command which, e.g., and in an embodiment, do not affect (e.g. write to) data elements for the rendering tile (and so, e.g., consider whether the next command to be processed for the rendering tile which does affect (e.g. write to) data elements for the rendering tile, is a repeated instance of the "full-frame" command).

(Similarly, it will be appreciated that the graphics processor (e.g. primitive list reading circuit) could determine that a "full-frame" graphics processing command is unnecessary to process when it is determined that the "full-frame" command itself is a repeated instance of an e.g. previous "full-frame" command.)

Thus, in an embodiment, the graphics processor determines whether the "full-frame" graphics processing command is one of consecutive (repeated) instances of the "full-frame" graphics processing command to be processed for the rendering tile; and determines that it is unnecessary to process the "full-frame" graphics processing command for the rendering tile when it is determined that the "full-frame" graphics processing command is one of consecutive (repeated) instances of the "full-frame" graphics processing command to be processed for the rendering tile.

The (command omitting circuit of the) primitive list reading circuit may identify that the next (or previous) command to be processed for the rendering tile is a repeated instance of the "full-frame" command in any suitable and desired manner.

In an embodiment, the primitive list reading circuit, upon reading a "full-frame" command from a primitive list for the rendering tile, "holds back" the "full-frame" command, and before the graphics processor processes the "full-frame" command, the primitive list reading circuit determines the next command to be processed for the rendering tile (by reading the primitive list(s) for the rendering tile). The primitive list reading circuit then in an embodiment determines whether the next command to be processed for the rendering tile is a second (repeated) instance of the "full-frame" command.

The (command omitting circuit of the) primitive list reading circuit may determine whether the next command to be processed for the rendering tile is a second (repeated) instance of the "full-frame" command in any suitable and desired manner.

In an embodiment, the graphics processing system is configured such that each instance of the "full-frame" command comprises the same configuration data (state data) indicating data (e.g. an index or pointer) as each other instance of the "full-frame" command (indicative of the same configuration data (state data)).

Thus, in an embodiment, repeated instances of a "full-frame" command are identified by comparing configuration data (state data) indicating data (e.g. indexes or pointers, such as, and in an embodiment, an index for a draw call descriptor) included in the commands. If the configuration data (state data) indicating data, e.g. (e.g. draw call descriptor) indexes, for the commands are the same, then the commands can be, and are in an embodiment, taken to be the same (and vice-versa).

Thus, the (command omitting circuit of the) primitive list reading circuit in an embodiment determines whether the next command to be processed for the rendering tile is a second (repeated) instance of the "full-frame" command by comparing the configuration data (state data) indicating data (e.g. indexes or pointers) included in the commands. In this case, it is determined that the next command to be processed for the rendering tile is a second (repeated) instance of the "full-frame" command when the configuration data (state data) indicating data (e.g. index or pointer) for the next command is the same as the configuration data (state data) indicating data (e.g. index or pointer) for the (first) "full-frame" command.

Then, when it is determined that the next command to be processed for the rendering tile is a second (repeated) instance of the "full-frame" command, the primitive list reading circuit in an embodiment causes the graphics processor to omit processing one of the repeated instances of the "full-frame" command. This may be achieved by the primitive list reading circuit passing (only) a single instance of the "full-frame" command to subsequent stages of the graphics processor, such as the rasteriser, for processing. In an embodiment, the second (repeated) instance of the "full-frame" command, in effect, "overwrites" the first instance of the "full-frame" command.

In this way, identified repeated instances of a "full-frame" command may, in effect, be "coalesced" into a single "full-frame" command for subsequent processing by the e.g. rasteriser of the graphics processor, so that only a single instance of the repeated "full-frame" command (i.e. the "coalesced" command) is processed for the rendering tile.

If, however, the next command to be processed for the rendering tile is not a second instance of the "full-frame" command (if the next command is a different command), the primitive list reading circuit then in an embodiment causes the graphics processor to process both the first instance of the "full-frame" command and (then) the next command. Thus, the primitive list reading circuit may pass both commands to subsequent stages of the graphics processor, such as the rasteriser, for processing.

Where the (rasteriser of the) graphics processor processes only a single instance of repeated instances of a "full-frame" command, then the graphics processor in an embodiment loads configuration data (state data) for only a single instance of the "full-frame" command.

Thus, an embodiment comprises the graphics processor reading (loading) configuration data (state data) (from (the) memory) for only one of unnecessarily or undesirably repeated instances of a "full-frame" command, and then processing (only) a single instance of the "full-frame" command according to the read configuration data (state data).

Thus in the present embodiment, the primitive list reader is able to identify repeated instances of the "full-frame" command before the graphics processor reads (loads) configuration data (state data) for the repeated instances of the "full-frame" command. This can avoid the need to read (load) configuration data in respect of unnecessarily or undesirably repeated instances of the "full-frame" command, thereby reducing bandwidth requirements. Thus, the present embodiment can further reduce memory traffic (bandwidth) and usage, and accordingly power usage, for graphics processing operations for an entire render output.

Additionally or alternatively, in an embodiment, the graphics processor reads configuration data (state data) (from (the) memory) according to information indicative (e.g. an index or pointer) of the (location of) configuration data (state data) included in a "full-frame" command, processes the "full-frame" command according to the read configuration data (state data), and then processes one or more other instances of the "full-frame" command according to the read configuration data (state data).

The Applicants have furthermore recognised that where plural instances of a "full-frame" command are to be processed, then it may be advantageous to only read configuration data (state data) associated with the "full-frame" command for (only) one of the plural instances of the "full-frame" command to be processed, rather than for each of the plural instances of the "full-frame" command to be processed.

This means that the overall bandwidth consumed can be reduced as compared to reading configuration data (state data) for each of the plural instances of the "full-frame" command. Thus, the present embodiment can further reduce memory traffic (bandwidth) and usage, and accordingly power usage, for graphics processing operations for an entire render output.

Additionally or alternatively, in an embodiment, where the "full-frame" command is a command to draw a "full-frame" primitive and to perform a "full-frame" graphics processing operation for the "full-frame" primitive that sets each data element corresponding to the entire area of the render output to a respective selected, in an embodiment predetermined value, determining whether it is unnecessary to process the "full-frame" graphics processing command for the rendering tile comprises determining whether each data element for the rendering tile is (already) set to the respective selected value; and determining that it is unnecessary to process the "full-frame" command for the rendering tile when it is determined that each data element for the rendering tile is (already) set to the respective selected value.

This operation may be achieved as desired. However, in an embodiment, the graphics processor comprises a rasteriser (e.g., and in an embodiment, as described above) (and the rasteriser comprises the command omitting circuit), and the rasteriser, before rasterising (processing) the "full-frame" primitive for the rendering tile, determines whether each data element for the rendering tile is (already) set to the respective selected value. The rasteriser then omits processing (omits rasterising (generating fragments for)) the "full-frame" primitive for the rendering tile when it is determined that each data element for the rendering tile is (already) set to the respective selected value.

For example, and in an embodiment, where the graphics processing operation is a "full-frame" clear operation to be performed for a "full-frame" primitive in respect of a rendering tile, the rasteriser determines whether the rendering tile is already cleared, and if the rendering tile is already cleared, omits rasterising the "full-frame" primitive for the rendering tile.

In an embodiment, the rasteriser is configured to perform so-called "hierarchical" rasterisation (e.g., and in an embodiment, as described above), and the rasteriser of the graphics processor is configured to, in response to the "full-frame" command to draw the "full-frame" primitive covering the entire area of the render output to be processed for the rendering tile, test the "full-frame" primitive against a patch covering the entire area of the render output being generated to determine if each data element for the rendering tile is (already) set to the respective selected value. If it is determined that each data element for the rendering tile is (already) set to the respective selected value, then the patch is in an embodiment not subdivided, and in an embodiment no fragments are generated for the patch.

In this way, fragments are not generated for the "full-frame" primitive in respect of the rendering tile, and so processing (rendering) of the "full-frame" command is stopped ("skipped over") for that rendering tile.

In another embodiment, where the "full-frame" command is a command to perform a "full-frame" clear operation (to clear, e.g., stencil values and/or depth values), the (command omitting circuit of the (primitive list reading circuit of the)) graphics processor identifies whether any other graphics processing commands (in the primitive list(s)) are to be processed for the rendering tile following the "full-frame" command which could (or will) affect (e.g. draw to) data values corresponding to the rendering tile.

Thus, in this case, determining whether it is unnecessary to process the "full-frame" clear command for the rendering tile in an embodiment comprises determining whether other commands (in the primitive list(s)) are to be processed for the rendering tile following the "full-frame" clear command (which e.g. affect (draw to) or use data values corresponding to the rendering tile).

In this case, it is determined that processing the "full-frame" clear command for the rendering tile is unnecessary when it is determined that no other commands following the "full-frame" clear command (which affect (draw to) or use data values corresponding to the rendering tile) are to be processed for the rendering tile.

The Applicants have recognised that in the case of a "full-frame" clear operation, it may not be necessary to perform the clear operation for a rendering tile if there are no other commands to process for that rendering tile following the clear operation to generate the render output and/or if the data values for the rendering tile are not subsequently used.

Although the technology described herein has been described above with particular reference to a single rendering tile, it will be appreciated that the technology described herein can be, and in an embodiment is, applied to plural and in an embodiment to each rendering tile that is generated by the graphics processor to form the render output (frame). Similarly, although the technology described herein has been described above with particular reference to generating a single render out (e.g. frame), it will be appreciated that the technology described herein can be, and in an embodiment is, applied to each of plural render outputs (frames) in a sequence of render outputs (frames) being generated by the graphics processor.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any form or configuration of graphics processor, such as graphics processors having a "pipelined" arrangement (in which case the graphics processor comprises a rendering pipeline).

The graphics processing system and/or graphics processor may also comprise, and/or be in communication and/or associated with, one or more memories and/or memory devices that store the data described herein, and/or the output data generated by the graphics processing system or graphics processor, and/or software for performing the processes described herein.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuit(s)/circuitry) and/or programmable hardware elements (processing circuit(s)/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages of the technology described herein may be embodied as processing stage circuit/circuitry, e.g., in the form of one or more fixed-function units (hardware) (processing circuits), and/or in the form of programmable processing circuits that can be programmed to perform the desired operation. Equally, any one or more of the processing stages and processing stage circuits/circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

The embodiment of the technology described herein relates to performing a graphics processing operation for the entire area of a render output (in an embodiment a frame for display) being generated by a graphics processor of a graphics processing system.

Such a system may be configured as shown in FIG. 1 (and described above). FIG. 1 shows a typical computer graphics processing system, comprising a host processor (CPU) 1, a graphics processing unit (GPU) 3, and a memory 5 for storing data required by and/or generated by the host processor (CPU) 1 and graphics processing unit (GPU) 3.

The memory 5 may be "on-chip" with the GPU 3 and/or CPU 1, or may be an external memory that can be accessed by the GPU 3 and/or CPU 1.

When an application 2 that is executing on the CPU 1 requires graphics processing from the GPU 3, such as a frame to be displayed, the application 2 may send appropriate commands and data to a driver 4 for the GPU 3 that is running on the CPU 1.

The driver 4 may then send appropriate commands and data to the GPU 3 to cause it to generate the graphics output required by the application 2. The commands and data provided by the driver 4 typically include commands to "draw" primitives to be rendered for the render output (frame) to be generated by the GPU 3, together with associated vertex data representing the vertices to be used for the primitives for the render output (frame).

The driver 4 may send commands and data to the GPU 3 by writing to data structures 6 in the memory 5, which data structures 6 may then be read by the GPU 3. Typically, the CPU 1 also writes vertex data defining the vertices for primitives to be drawn to the memory 5.

The commands sent to the GPU 3 will then typically cause the GPU 3 to read and process the vertex data stored in the memory 5 to generate the render output (frame). The GPU 3 will typically use the vertex data for a primitive to rasterise the primitive so as to determine a region of the render output (frame) to which the primitive applies, and to then render the primitive for that region.

Once all of the primitives to be rendered for the render output (frame) have been rendered, the completed render output (frame) may be written to a frame buffer 7 in the memory 5, from where it may be provided for display on a display device, such as a screen or printer.

In these embodiments of the technology described herein, the graphics processing system is configured such that when it is desired to perform a graphics processing operation acting over the entirety of the area of a render output (frame) that is being generated, e.g. when it is desired to perform a "full-frame" graphics processing operation, the CPU 1 issues to the GPU 3 a particular, or "special" command to draw a primitive that occupies the entirety of the area of the render output (frame) being generated, e.g. the CPU 1 issues to the GPU 3 a "full-frame" command to draw a "full-frame" primitive. The GPU 3 then draws the "full-frame" primitive and performs the graphics processing operation for the "full-frame" primitive. As discussed above, the Applicants have found this to be a particularly efficient and convenient arrangement for performing a "full-frame" graphics processing operation.

Moreover, the "full-frame" command to draw a "full-frame" primitive is issued to the GPU 3 without the CPU 1 writing (or having written) vertex data defining the vertices of the "full-frame" primitive to the memory 5. In contrast, in these embodiments, the GPU 3, in response to the "full-frame" command, determines (itself) the vertices to use for the "full-frame" primitive from the area of the frame (or frame buffer 7).

As discussed above, this has the advantage of e.g. avoiding the need for the CPU 1 to write vertex data to the memory 5 and the GPU 3 to read vertex data from the memory 5 for the "full-frame" primitive. Accordingly, bandwidth and power requirements for performing a "full-frame" graphics processing operation can be reduced.

In the present embodiments, the graphics processing system uses so-called "tile-based" rendering. The "full-frame" command to draw a "full-frame" primitive is thus in an embodiment processed on a "tile-by-tile" basis.

Figure 2:
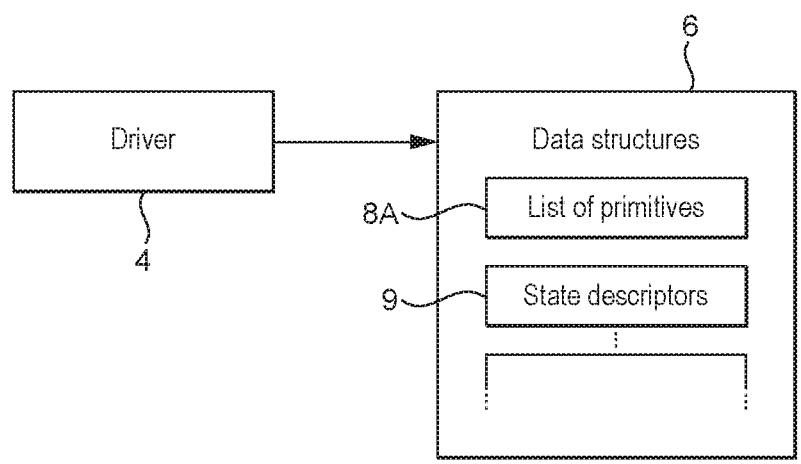
FIG. 2 illustrates a driver and memory data structures of a graphics processing system in accordance with an embodiment of the technology described herein.

FIG. 2 shows the operation of the driver 4 for a tile-based graphics processing system in more detail, according to the present embodiments. As shown in FIG. 2, the driver 4, in response to the commands and data received from the application 2, may write to the data structures 6 in the memory 5. The data structures 6, at this stage, may include commands 8A to be processed for the frame, together with a list of state descriptors 9.

The state descriptors 9 may include data for configuring the GPU 3 to process the commands, such as data in the form of any one or more of: a "Draw Call Descriptor" ("DCD"), a "Frame Buffer Descriptor" ("FBD"), a "Renderer Target Descriptor" ("RTD"), a "Blend Descriptor", "Scissor Box Descriptor", a "Shader Program Descriptor", a "Texture Descriptor", and other descriptors that describe the renderer state. Typically, each command in the list of primitives 8A includes one or more indices indicating the data for the state descriptors 9 to use to process the command in question. The memory 6 can also store the vertex data defining the vertices of the primitives.

As discussed above, in tile-based rendering, the two-dimensional render output (frame) is rendered as a plurality of smaller area sub-regions, usually referred to as "tiles". The tiles are each rendered separately (typically one-after-another). The rendered tiles are then recombined to provide the complete render output (e.g. frame for display). In such arrangements, the render output is typically divided (by area) into regularly-sized and shaped rendering tiles (they are usually e.g., squares or rectangles).

The advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, in the present embodiments, the GPU 3 prepares for each rendering tile a list of the commands (primitives) to be processed for that rendering tile (e.g. that will apply to the tile), by arranging the primitives in the list of primitives 8A produced by the driver 4 into respective "primitive lists" 8B (which can also be referred to as a "tile list" or "polygon list") that identify (e.g. by reference to a primitive indicator) the commands (primitives) to be processed for the tile in question.

In one embodiment, the GPU 3 prepares primitive lists for only single rendering tiles (one for each single rendering tile). In another embodiment, however, the GPU 3 prepares primitive lists both for single rendering tiles, and primitive lists for output frame areas comprising more than one tile (i.e. primitive lists that encompass more than one rendering tile (and thereby, in effect, a larger area) of the frame to be generated). In other words, as well as preparing lists of commands (primitives) that are exclusive to single rendering tiles only, primitive lists that can and will be used for plural rendering tiles in common can be and are prepared.

In one such embodiment, primitive lists are prepared for plural sets of rendering tiles that are arranged in a hierarchical fashion. For example, at the "top level" of the hierarchy, a primitive list is prepared in respect of the entire output frame. At the next "level" of the hierarchy, a primitive list is prepared in respect of each of four sub-regions that the frame area is divided into. At the next "level" of the hierarchy, a primitive list is prepared in respect of each of 16 sub-regions that the frame area is divided into, and so on, down to the "bottom level" of the hierarchy where primitive lists are prepared in respect of each individual rendering tile.

When a command to draw a primitive is received for processing by the GPU 3, it may be put in the appropriate primitive list(s) (stored in the data structures 6 in the memory 5). This is typically done by reading and processing vertex data for the primitive (from the memory 5) to determine a location for the primitive, comparing the primitive's location with the locations of the frame areas for which primitive lists are being prepared, and then allocating the primitive to the primitive list(s) based on the comparison. This may be done using a bounding box binning technique or an exact binning technique, for example.

In contrast, in the present embodiments, the "full-frame" command to draw a "full-frame" primitive may be listed in the appropriate primitive list(s) without reading and processing vertex data for the "full-frame" primitive. In this regard, the Applicants have recognised that it is possible to determine the primitive list(s) to list a "full-frame" primitive in without needing to read and process vertex data for the "full-frame" primitive, since a "full-frame" primitive should, by definition, be listed in primitive list(s) for an area corresponding to the entire render output frame in order for the primitive to be processed for the entire frame.

Thus, where primitive lists are prepared for (only) single rendering tiles, the "full-frame" command may be listed in the primitive lists for each rendering tile (in an embodiment without reading and processing vertex data for the "full-frame" primitive). Where primitive lists are prepared in a hierarchical fashion, the "full-frame" command may be listed in the primitive list for the entire output frame, at the "top level" of the hierarchy (in an embodiment without reading and processing vertex data for the "full-frame" primitive).

Once lists of commands (primitives) to be processed (the primitive lists) have been prepared for each single rendering tile (and for frame areas comprising more than one tile, as the case may be), the primitive lists may be stored for use in the data structures 6 in the memory 5, e.g., to allow the GPU 3 to identify which commands (primitives) need to be considered (and processed) when the tile in question is rendered.

Then, when a tile is being rendered, the GPU 3 may read the primitive list(s) for the tile in question, and process each command listed in the list(s) in turn to generate an output frame area for the tile. The GPU 3 will typically process each command to draw a primitive by rasterising the primitive to fragments and then processing (rendering) the fragments.

Each tile may be rendered in turn in this manner, and the output frame areas for all of the tiles combined to generate the entire output frame, which may be stored in the frame buffer 7 in the memory 5 for display.

Thus, in an embodiment, the GPU 3 rasterises a "full-frame" primitive to fragments covering the entire frame area, and then processes (renders) those fragments. This is done without reading and processing vertex data for the "full-frame" primitive.

Figures 3A, 3B:
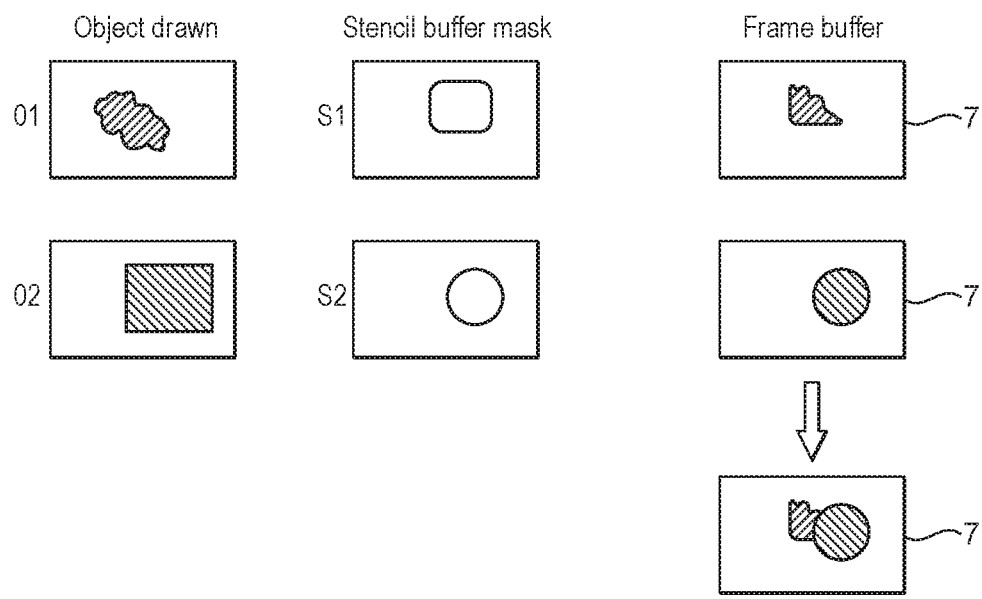
FIG. 3A shows an exemplary sequence of graphics processing commands which may be processed in the manner of the technology described herein.
FIG. 3B illustrates the effects of processing the exemplary sequence of graphics processing commands of FIG. 3A.

FIG. 3A shows an example list of commands sent by the application 2 to the driver 4 to perform two stencil operations in an embodiment of the technology described herein. Before the GPU 3 processes these commands, all of the state descriptors 9 stored in the memory 5 may be set to "default" states.

The first command in the example shown in FIG. 3A, command C1, is a "full-frame" command to clear stencil values for an area corresponding to the entire output frame by drawing a "full-frame" primitive and processing the "full-frame" primitive to clear the stencil values.

As discussed above, commands such as those shown in FIG. 3A will typically be processed in a tile-based graphics processing system by processing the commands on a "tile-by-tile" basis. Thus, for example, each time command C1 is processed for a particular tile, the stencil buffer for the tile may be "cleared".

As shown in FIG. 3A, command C1 is followed by command S1, which is a command to draw a first stencil mask to the stencil buffer (for the appropriate tile(s)). The next command in the list of commands, command O1, is a command to draw object 1 to the frame buffer 7 using the first stencil mask drawn according to command S1.

As discussed above, upon receiving these commands, the driver 4 may instruct the GPU 3 to process the commands appropriately. Thus, the GPU 3 may read each command provided to it by the driver 4, load state data associated with a respective command from the state descriptors 9 in memory 5 according to an index in the command, and process the command according to the state data.

The effect of the GPU 3 processing the first three commands (C1, S1 and O1) is illustrated in the top row of FIG. 3B. As shown in the top row of FIG. 3B, by applying the first stencil buffer mask drawn according to command S1 to object 1 according to command O1, only the masked portion of object 1 is drawn to the frame buffer 7.

Once object 1 has been written out to the frame buffer 7, in this example, it is desired to perform a second stencil operation using a different stencil mask. To ensure that the previously drawn stencil data does not affect the second stencil operation, the entirety of the stencil data is cleared.

Thus, as shown in FIG. 3A, the list of commands sent by the application 2 to the driver 4 includes a second "full-frame" clear command, command C2, to clear stencil values for an area corresponding to the entire output frame. As shown in FIG. 3A, this is followed by command S2 to draw a second stencil mask, and then command O2 to draw object 2 to the frame buffer 7 using the second stencil mask drawn according to command S2.

The effect of the GPU 3 processing commands C2, S2 and O2 is illustrated in the middle row of FIG. 3B. As shown in the middle row of FIG. 3B, by applying the second stencil buffer mask drawn according to command S2 to object 2 according to command O2, only the masked portion of object 2 is drawn to the frame buffer 7.

The combination of the two stencil operations is illustrated in the bottom row of FIG. 3B. As shown in the bottom row of FIG. 3B, the frame buffer 7 includes object 2 stencilled according to the second stencil mask overlaying object 1 stencilled according to the first stencil mask.

Figure 4:
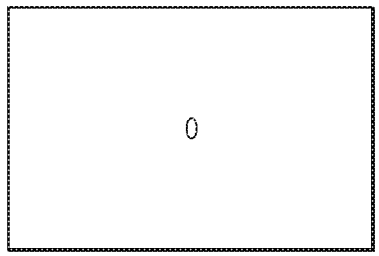
FIG. 4 illustrates how the commands of the exemplary sequence of graphics processing commands of FIG. 3A are placed into different levels of a hierarchy of primitive lists in a manner in accordance with an embodiment of the technology described herein.
Figure 4:
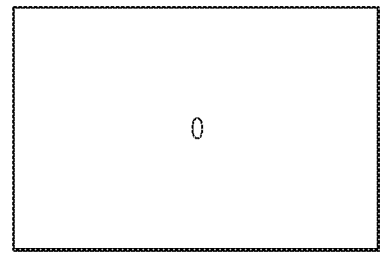
Figure 4:
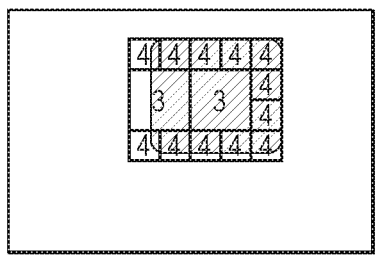
Figure 4:
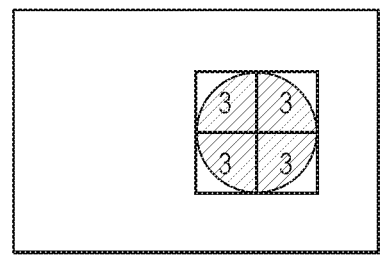
Figure 4:
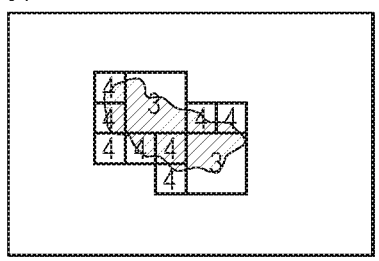
Figure 4:
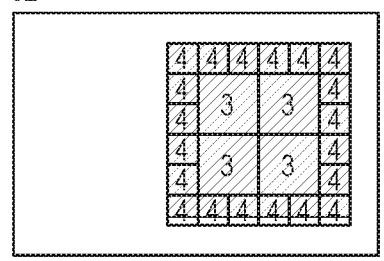

FIG. 4 illustrates the preparing of "hierarchical" primitive lists for the graphics processing commands of the example of FIG. 3, in accordance with the present embodiments.

As discussed above, in the present embodiments, the graphics processing system is configured such that a "full-frame" command to draw a "full-frame" primitive, is listed in the primitive list for the entire area of the output frame, i.e. at the highest level of the hierarchy. This is done without the GPU 3 reading and processing vertex data for the "full-frame" primitive.

Thus, as shown in FIG. 4, the GPU 3 lists the "full-frame" clear command C1, at the highest level of the hierarchy, level "0". Similarly, "full-frame" clear command C2 is also listed in the primitive list for level "0".

As shown in FIG. 4, commands S1, S2, O1 and O2, however, are each listed in various primitive lists at lower levels, levels "3" and "4", of the hierarchy. This may be done, in contrast with the case of "full-frame" commands, by the GPU 3 processing vertex data defining the vertices of primitives corresponding to the desired operations to determine the position of the primitive in question, and comparing the position of the primitive in question with the positions of the "hierarchical" sub-regions that the output frame has been divided into to determine the appropriate sub-region(s) to list the primitive for.

Figure 5A:
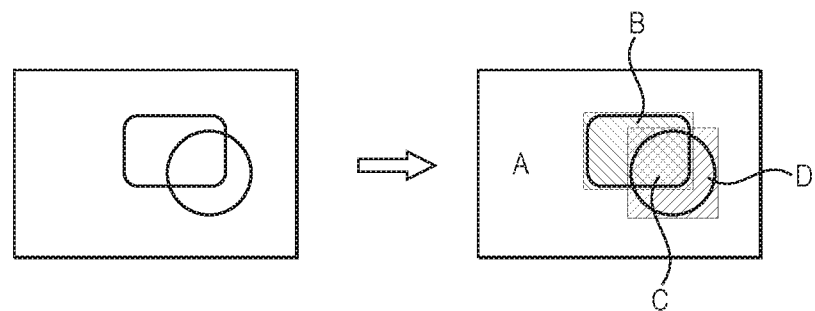
FIGS. 5A and 5B illustrate how stencil buffer commands of the exemplary sequence of graphics processing commands of FIG. 3A apply to stencil values corresponding to different tile regions of the render output in a manner in accordance with an embodiment of the technology described herein.
Figure 5B:
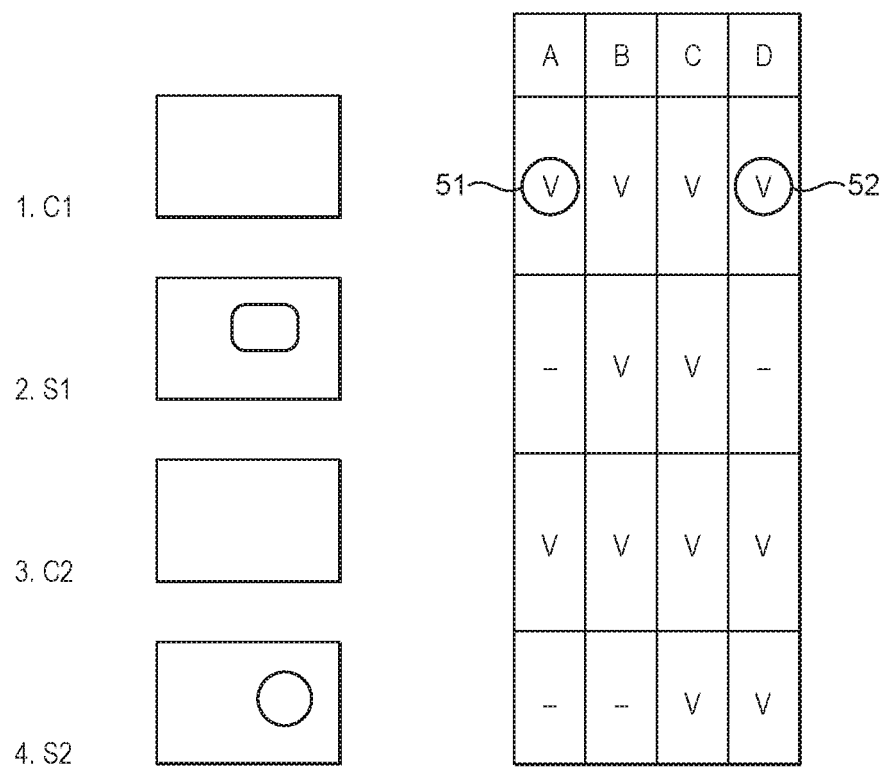

FIGS. 5A and 5B illustrates how the stencil commands of the example of FIG. 3 apply to stencil values corresponding to different tile regions of the output frame. As illustrated in FIG. 5A, both stencil write commands S1 and S2 apply to the tiles of region C; only the first stencil write command, S1, applies to the tiles of region B; only the second stencil write command, S2, applies to the tiles of region D; and neither command S1 nor command S2 apply to the tiles of region A. "Full-frame" stencil clear commands C1 and C2, however, each apply to stencil values for the entire area of the output frame, i.e. "full-frame" stencil clear commands C1 and C2 each apply to the tiles of regions A, B, C and D.

The list of commands to be processed for the tiles of each region A-D is illustrated in FIG. 5B. As shown in FIG. 5B, the tiles of region A have stencil clear command C1 followed by stencil clear command C2 to be processed for them. The tiles of region B have stencil clear command C1, then stencil write command S1, and then stencil clear command C2 to be processed for them. The tiles of region C have stencil clear command C1, then stencil write command S1, then stencil clear command C2, and then stencil write command S2 to be processed for them. The tiles of region D have stencil clear command C1, then stencil clear command C2, and then stencil write command S2 to be processed for them.

Thus, as shown in FIG. 5B, in this example, the tiles of region A have two stencil clear commands (C1 and C2) to be processed for them without a stencil write command to be processed in between those stencil clear commands. Thus, processing the first clear command C1 for the tiles of region A will have the effect of clearing the tiles of region A such that, e.g. the value for each stencil data element (pixel) for the tiles of region A will be set to zero (or another value indicating that a data element is "cleared"). Processing the second clear command C2 for the tiles of region A, will however, have essentially no effect for the tiles of region A, since the tiles of region A will have already been cleared by processing command C1. As can be seen from FIG. 5B, the same applies to the tiles of region D.

Thus, in the present embodiments, the GPU 3 will only process a single instance of the repeated stencil clear command in respect of the tiles of region A (and the tiles of region D). I.e. the GPU 3 processes either command C1 or command C2 for the tiles of region A (and D) (and omits processing the other). In an embodiment, command C1 51, 52 is discarded and only command C2 is processed. In this way, commands C1 and C2 are, in effect, "coalesced" into a single stencil clear command for the tiles of regions A and D. As discussed above, this means that the overall processing required to perform the stencil operation is reduced.

In the case of the tiles of region C, however, as shown in FIG. 5B, the tiles of this region are cleared, then written to by the first stencil write command S1, then cleared again, and then written to again by the second stencil write command S2. In this case, it will be appreciated that both clear operations should be (and in an embodiment are) performed to ensure that each write operation has the desired effect.

Figures 6A, 6B:
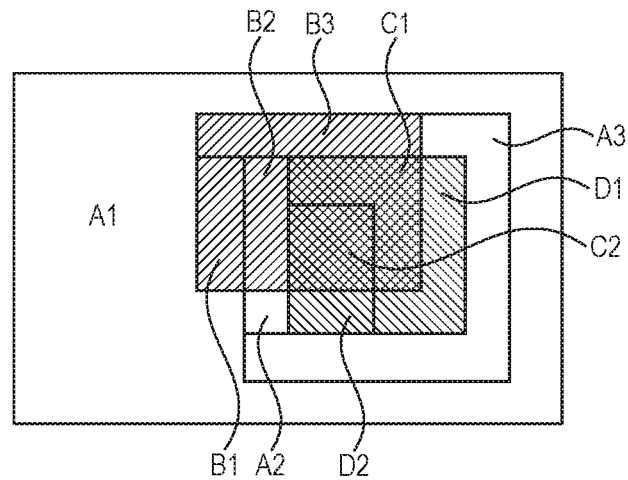
FIGS. 6A and 6B illustrate how commands of the exemplary sequence of graphics processing commands of FIG. 3A apply to different tile regions of the render output in a manner in accordance with an embodiment of the technology described herein.

FIGS. 6A and 6B illustrate how all of the graphics processing commands, including commands O1 and O2, of the example of FIG. 3 apply to different tile regions of the output frame.

As shown in FIGS. 6A and 6B, in this example, the tiles of regions A1, A3 and D1 each have two stencil clear commands (C1 and C2) to be processed for the tiles without any commands (at all) applying in between those stencil clear commands. Thus, as with regions A and D of the example of FIG. 5, according to the present embodiments, the GPU 3 will only process a single instance of the repeated stencil clear command in respect of these tiles. I.e. the GPU 3 processes either command C1 or command C2 (in an embodiment only command C2, and not command C1 61, 62, 63) for the tiles of regions A1, A3 and D1. This "coalescing" operation can reduce bandwidth and processing requirements, as discussed above.

In the present embodiments, the "coalescing" operation of the technology described herein is achieved by the GPU 3 "holding back" the processing of "full-frame" commands.

Thus, in these embodiments, when the GPU 3 reads a "full-frame" command for a tile it is processing, instead of immediately processing the "full-frame" command for the tile, the GPU 3 first reads the next command to process in the primitive list(s) for the tile. If the next command is also a "full-frame" command which can be "coalesced" with the first "full-frame" command, then the GPU 3 then "coalesces" the two commands such that, in effect, only one of the two "full-frame" commands is processed by the GPU 3.

If the next command is not a "full-frame" command which can be "coalesced" with the first "full-frame" command, however, then the GPU 3 may then process both commands.

If there is no next command to process for the tile, then (e.g. in the case that the "full-frame" command to process for the tile is a clear command) the GPU 3 may only process the "full-frame" (clear) command if it is necessary to do so, e.g. if data for the tile is to be used for a subsequent graphics processing operation (e.g. if it is to be "written back" to memory).

Thus, in the case of the tiles of region A1 (and regions A3 and D1) of the example of FIG. 6B (and regions A and D of the example of FIG. 5B), the GPU 3 first reads command C1 61 and then, before processing command C1 61, reads the next command for region A1, command C2. In this case, the GPU 3 will then determine that both commands are "full-frame" clear operations, and so will then "coalesce" these commands into a single "full-frame" clear command so as to process a single "full-frame" clear command for the tiles of region A1.

In the case of the tiles of region C2 (and regions B1, B2, B3 and C1) (and regions B and C in the example of FIG. 5B) by contrast, the GPU 3 first reads command C1 and then, before processing command C1, reads the next command for region C2, command S1. In this case, the GPU 3 will determine that the next command is not a "full-frame" clear operation, and so will then send both commands C1 and S1 for processing. Similarly, both commands C1 and O1 may be sent for processing in the case of the tiles of regions A2 and D2.

Furthermore, in the case of the tiles of region B1 (and region B of the example of FIG. 5B), when the GPU 3 reads command C2, before processing command C2, it may determine that there are no further commands to be processed for region B1. In this case, the GPU 3 may then process command C2. However, if e.g. the stencil buffer data for the tiles of region B1 will not be subsequently used (e.g. written back to memory 5), then the GPU 3 may also omit processing clear command C2 for the tiles of region B1.

In these embodiments, the "holding back"/"coalescing" of a "full-frame" command in an embodiment occurs before the GPU 3 reads configuration (state) data for the command. In this way, the GPU 3 can avoid reading state data for a command which it is not necessary to process. Accordingly, as discussed above, state descriptor "thrashing" and bandwidth requirements can be reduced.

Figure 7:
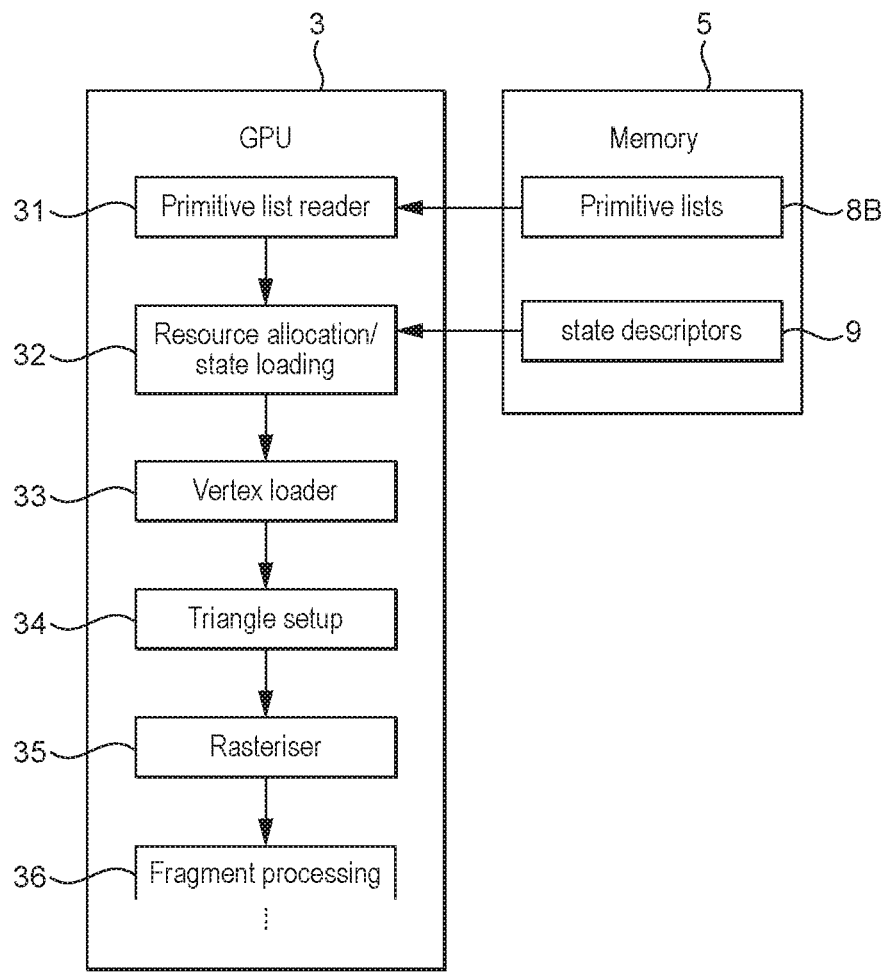
FIG. 7 shows an exemplary graphics processing system which may be operated in accordance with an embodiment of the technology described herein.

This operation may be achieved in a graphics processing system configured as shown in FIG. 7. As shown in FIG. 7, in the present embodiments, the GPU 3 includes a primitive list reader (circuit) 31, a resource allocation/state loading unit 32, a vertex loader 33, a triangle setup unit 34, a rasteriser 35, and a fragment processing unit 36.

In these embodiments, the primitive list reader 31 of the GPU 3 determines which command (primitive) is to be processed next for a tile currently being rendered. It does this by considering the primitive lists 8B, stored in the memory 5, and selecting from one of those lists the next command (primitive) to be processed. Typically, the primitive list reader 31 reads the stored primitive lists 8B, that have been determined as applying to the tile that is currently being rendered.

For example, where primitive lists are prepared in a "hierarchical" fashion in the manner as described above, the primitive list reader 31 may read the primitive list that is exclusive to the individual rendering tile that is being rendered, the primitive list for the 2×2 rendering tile sub-region that includes the tile that is being rendered, the primitive list for the 4×4 rendering tile sub-region that includes the tile that is being rendered, and so on up to the primitive list for the rendering tile sub-region that covers the entire frame.

If the primitive list reader 31 selects a "full-frame" command (e.g. a "full-frame" clear command, such as command C1), the "full-frame" command is "held back", and before the "full-frame" command is passed to the resource allocation/state loading unit 32, the primitive list reader 31 selects the next command (primitive) to be processed for the tile in the manner as described above.

The primitive list reader 31 may then compare the "held-back" "full-frame" command with the next command. The comparison may be done by comparing indices included in the commands which indicate of the location of state data stored for the commands (e.g. draw call descriptor (DCD) indices). It is determined that the next command is another instance of the "held-back" "full-frame" command when the (e.g. "DCD") index of the next command is the same as the (e.g. "DCD") index of the "held-back" command.

If, based on the comparison (of index values), it is determined that the next command is not another instance of the "held-back" "full-frame" command (the indices are different), then the first "full-frame" command is passed to the resource allocation/state loading unit 32, followed by the next command. If, however, based on the comparison (of index values), it is determined that the next command is another instance of the "held-back" "full-frame" command (the indices are the same), then only one of the two "full-frame" commands is passed to the resource allocation/state loading unit 32, and the other "full-frame" command is discarded (in an embodiment the second "full-frame" command "overwrites" the first "full-frame" command). In this way, the two "full-frame" commands are, in effect, "coalesced" into a single "full-frame" command for a rendering tile.

The primitive list reader 31 then provides the selected "full-frame" command to the resource allocation/state loading unit 32 which loads state data from state descriptors 9 in the memory 5 according to the index in the command. The state data for the "full-frame" command loaded by the resource allocation/state loading unit 32 is used to configure the subsequent stages of the GPU 3 to process a "full-frame" primitive so as to perform the "full-frame" command for the tile.

It will be appreciated that by "coalescing" two "full-frame" commands into a single "full-frame" command before loading state data for the commands, only a single set of state data needs to be loaded from memory by the resource allocation/state loading unit 32 to process the single "full-frame" command. Bandwidth and power requirements can accordingly be reduced, as compared to loading state data for both commands. Bandwidth and power requirements may be further reduced by re-using loaded state data to process repeated instances of the "full-frame" command for a tile, where appropriate.

Typically, the vertex loader 33 would retrieve the appropriate vertex data for the primitive being processed from the memory 5, and provide the primitive (i.e. its vertex data) to the triangle setup unit 34 which would process the vertex data, e.g. by executing a triangle set up program, to provide data for the primitive in a form that is suitable for 2D placement of the primitive in the frame to be displayed (such as "edge functions defining the edges of the primitive and "barycentric functions" for varying interpolation). The primitive data would then be provided to the rasteriser 35 for processing.

However, in the present embodiments, the "full-frame" command (primitive) is "implicitly" full-frame and so is not associated with vertex data stored in the memory 5. In this case, therefore, the GPU 3 (the triangle set up unit) (itself) determines the vertices for the "full-frame" primitive.

It does this by reading width and height values for the frame being generated from the "Frame Buffer Descriptor" stored in the data structures 6 in the memory 5, and drawing the "full-frame" primitive as a front-facing axis-aligned rectangle, having the following coordinates:
1. {0, 0, 0, 1}
2. {width, 0, 0, 1}
3. {0, height, 0, 1}.

The triangle setup unit 34 then executes a triangle setup program which is specific to "full-frame" primitives, to generate edge functions and barycentric functions for the "full-frame" primitive. In the present embodiments, the "full-frame" triangle setup program generates the edge functions and barycentric functions for the "full-frame" primitive using the determined vertex positions for the "full-frame" primitive.

The rasteriser 35 then rasterises the "full-frame" primitive to fragments covering the entire area of the region (tile) being processed. The rasteriser 35 then provides those fragments to the fragment processing unit 36 for rendering. The fragment processing unit 36 performs graphics processing operations according to the loaded state data on the fragments, and stores the rendered fragment data in tile buffers for providing to the frame buffer 7 (for a display).

This process is repeated for all the commands (primitives) that need to be processed for a given rendering tile (i.e. that are included in primitive lists 8 appropriate to the tile) until all the commands (primitives) for the tile have been processed (and so the tile buffers contain all the rendered data for the tile in question). The rendered tile data is then in an embodiment written out (exported) to the frame buffer 7 in the memory 5.

The GPU 3 then renders the next rendering tile in the same manner, and so on, until all the individual rendering tiles for the frame have been rendered (and written out to the frame buffer 7). The process is then repeated for the next output frame to be generated, and so on.

The GPU 3 may be configured, additionally or alternatively, to "skip over" "full-frame" commands, where appropriate. For example, in the present embodiments, the GPU 3 is configured to be able to determine, upon receiving a "full-frame" primitive to process to perform a "full-frame" clear operation in respect of a rendering tile, whether the target area of the "full-frame" clear operation has already been cleared. If the GPU 3 determines that the target area of the "full-frame" clear operation has already been cleared, the GPU 3 omits processing ("skips over") the "full-frame" primitive for the tile.

In the present embodiments, the rasteriser 35 is configured to perform "hierarchical" rasterisation, wherein the rasteriser 35 iteratively tests primitives against progressively smaller patches of the frame, and generates fragments for rendering for patches of sampling points found to be covered at least in part by the primitive in question.

In these embodiments, the "hierarchical" rasteriser 35 is configured such that upon receiving a "full-frame" primitive to rasterise for performing a "full-frame" clear operation, the rasteriser 35 tests the "full-frame" primitive against a "full-frame" (or "full-tile") patch to determine if the target area covered by the patch has already been cleared. If it is determined that the target area covered by the patch has already been cleared, the patch is discarded and no fragments are generated for the "full-frame" primitive for subsequent processing by the fragment processing unit 36. In this way, the "full-frame" command is "skipped over" by the rasteriser 35.

For example, in the case of a stencil clear operation, the "hierarchical" rasteriser 35 may be configured (by state data) to have the following state:
Stencil reference value=clear value
Stencil test=not equal
Stencil function=set to reference This ensures that when stencil values are already equal to the cleared value, subdivision is stopped and the current patch is discarded, such that no fragments are generated for processing. If a stencil value is not equal to the cleared value, subdivision proceeds, and the stencil values are subsequently cleared by the generation and processing of fragments.

Thus, in the example of FIG. 6B, stencil clear command C2 64, 65 may be "skipped over" in this manner for the tiles of regions A2 and D2, since for these tiles the stencil buffer will already have been cleared by command C1, while intermediate command O1 will not have written to (affected) the stencil buffer.

Thus, by configuring the primitive list reader 31 in the above manner, unnecessarily repeated instances of a "full-frame" command to be processed for a rendering tile can be identified when the repeated "full-frame" commands are immediately consecutive to each other in the sequence of graphics processing commands to be processed for the rendering tile. Moreover, in this case, the repeated "full-frame" commands can be identified before the resource allocation/state loading unit 32 has loaded state data for the repeated commands. This means, as discussed above, that state data only needs to be loaded for a single instance of the repeated command.

By additionally configuring the rasteriser 35 in the above manner, unnecessarily repeated instances of a "full-frame" command to be processed for the rendering tile which are not immediately consecutive to each other in the sequence of graphics processing commands to be processed for the rendering tile (but which are separated by an intermediate command which does not, e.g. write to the stencil buffer) can also be identified. However, in this case, the repeated commands are identified after the resource allocation/state loading unit 32 has (already) loaded state data for both instances of the command.

Although the above has been described with particular reference to omitting processing a graphics processing command for a (singular) sub-region or tile, it will be appreciated that the technology described herein can be applied to one or more, and in an embodiment each, sub-region or tile that the render output has been divided into.

Similarly, although the above has been described with particular reference to a (singular) render output or frame, it will be appreciated that the technology described herein can be applied to one or more, and in an embodiment each, render output or frame that the graphics processor generates.

Although the above has been described with particular reference to a stencil buffer clear operation, it will be appreciated that the technology described herein also extends to other graphics processing operations and/or other target areas, such as a "blitting" operation, or a depth buffer clear operation or a filtering operation.

Similarly, although the above has been described with particular reference to generating an output frame for display, it will be appreciated that the technology described herein also extends to other render outputs, such as intermediate data intended for use in later rendering passes (e.g. a "render to texture" output).

It can be seen from the above, the technology described herein, in its embodiments at least, provides an improved method for performing graphics processing operations for an entire render output in a tile-based graphics processing system. This is achieved, in embodiments of the technology described herein at least, by a graphics processor of the graphics processing system drawing a "full-frame" primitive by determining the vertices for the "full-frame" primitive from the area of the render output, and performing the graphics processing operation for the "full-frame" primitive. In embodiments processing of a "full-frame" graphics processing command for a rendering tile is omitted, when it is determined that processing the "full-frame" graphics processing command for the rendering tile is unnecessary.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system comprising a graphics processor, the method comprising:
   when it is desired to perform a graphics processing operation for the entirety of the area of a render output that is being generated by the graphics processor:
   issuing, to the graphics processor, a command to draw a primitive that occupies the entirety of the area of the render output and to perform the graphics processing operation for the primitive that occupies the entirety of the area of the render output, and in response to which command, the graphics processor will determine the vertices for the primitive that occupies the entirety of the area of the render output based on the area of the render output; and
   the graphics processor in response to the command to draw a primitive that occupies the entirety of the area of the render output and to perform the graphics processing operation for the primitive that occupies the entirety of the area of the render output:
      determining the vertices for the primitive that occupies the entirety of the area of the render output based on the area of the render output;
      drawing the primitive that occupies the entirety of the area of the render output using the vertices determined based on the area of the render output so as to occupy the entirety of the area of the render output;
      rasterising the primitive that occupies the entirety of the area of the render output to generate one or more fragments; and
      performing the graphics processing operation defined for the command for the one or more fragments generated by rasterising the primitive that occupies the entirety of the area of the render output.

2. The method of claim 1, wherein issuing the command to draw the primitive that occupies the entirety of the area of the render output to the graphics processor is performed without writing vertex data associated with the primitive that occupies the entirety of the area of the render output to memory.

3. The method of claim 1, wherein the graphics processing system is a tile-based graphics processing system, the render output is divided into plural rendering tiles for rendering purposes, and the method comprises:
   the graphics processor:
   determining whether it is unnecessary to process the command for a rendering tile of the plural rendering tiles that the render output has been divided into; and
   when it is determined that processing the command for the rendering tile is unnecessary, omitting processing the command for the rendering tile.

4. A method of operating a tile-based graphics processor, in which a render output of the graphics processor is divided into plural rendering tiles for rendering purposes, and each rendering tile is generated by the graphics processor processing graphics processing commands for the respective rendering tile; the method comprising:
   the graphics processor, when generating a rendering tile, in response to a graphics processing command to draw a primitive that occupies the entirety of the area of the render output and to perform a graphics processing operation for the primitive that occupies the entirety of the area of the render output for the rendering tile:
   determining whether it is unnecessary to process the graphics processing command to draw a primitive that occupies the entirety of the area of the render output and to perform a graphics processing operation for the primitive that occupies the entirety of the area of the render output for the rendering tile; and
   when it is determined that processing the graphics processing command to draw a primitive that occupies the entirety of the area of the render output and to perform a graphics processing operation for the primitive that occupies the entirety of the area of the render output for the rendering tile is unnecessary, omitting processing the graphics processing command to draw a primitive that occupies the entirety of the area of the render output and to perform a graphics processing operation for the primitive that occupies the entirety of the area of the render output for the rendering tile; and
   when it is not determined that processing the graphics processing command to draw a primitive that occupies the entirety of the area of the render output and to perform a graphics processing operation for the primitive that occupies the entirety of the area of the render output for the rendering tile is unnecessary, processing the graphics processing command to draw a primitive that occupies the entirety of the area of the render output and to perform a graphics processing operation for the primitive that occupies the entirety of the area of the render output for the rendering tile;

wherein processing the graphics processing command to draw a primitive that occupies the entirety of the area of the render output and to perform a graphics processing operation for the primitive that occupies the entirety of the area of the render output for the rendering tile comprises:
drawing the primitive that occupies the entirety of the area of the render output;
rasterising the primitive that occupies the entirety of the area of the render output to generate one or more fragments; and
performing the graphics processing operation for the one or more fragments generated by rasterising the primitive that occupies the entirety of the area of the render output.

5. The method of claim 4, wherein the graphics processing operation is an operation that sets each data element corresponding to the entire area of the render output to a respective selected value.

6. The method of claim 5, wherein the graphics processing operation is selected from: (i) a "blitting" operation; (ii) a stencil clear operation; (iii) a depth clear operation; (iv) a background image loading operation; and (v) a filtering operation.

7. The method of claim 5, wherein determining whether it is unnecessary to process the graphics processing command for the rendering tile comprises determining whether a repeated instance of the command is to be processed for the rendering tile, wherein the command and the repeated instance of the command are to be processed for the rendering tile without an intermediate command in response to which the graphics processor will set a data element for the rendering tile to a value other than the respective selected value; and
determining that it is unnecessary to process the graphics processing command for the rendering tile when it is determined that a repeated instance of the command is to be processed for the rendering tile, wherein the command and the repeated instance of the command are to be processed for the rendering tile without an intermediate command in response to which the graphics processor will set a data element for the rendering tile to a value other than the respective selected value.

8. The method of claim 7, wherein:
graphics processing commands to be processed by the graphics processor to generate the render output are arranged into primitive lists representing different sub-regions of the render output;
the graphics processor comprises a primitive list reading circuit which reads the primitive lists to determine the graphics processing commands to be processed for each rendering tile; and the method comprises:
the primitive list reading circuit, in response to reading the command in a primitive list for the rendering tile:
determining whether a repeated instance of the command is to be processed for the rendering tile by determining whether the next command to be processed for the rendering tile is a repeated instance of the command; and
when it is determined that the next command to be processed for the rendering tile is a repeated instance of the command, causing the graphics processor to omit processing the command for the rendering tile.

9. The method of claim 7, further comprising:
when it is determined that processing the command for the rendering tile is unnecessary:
the graphics processor then loading configuration data for configuring the graphics processor to perform the graphics processing operation for only a single instance of the command, and processing only a single instance of the command according to the read configuration data for the rendering tile.

10. The method of claim 5, wherein:
determining whether it is unnecessary to process the command for the rendering tile comprises:
determining whether each data element for the rendering tile is set to the respective selected value; and
determining that it is unnecessary to process the command for the rendering tile when it is determined that each data element for the rendering tile is set to the respective selected value.

11. The method of claim 10, wherein:
the graphics processor comprises a rasteriser which determines whether each data element for the rendering tile is set to the respective selected value by testing the primitive that occupies the entirety of the area of the render output against a patch covering the area of the render output being generated.

12. A graphics processing system comprising a command issuing circuit and a graphics processor;
wherein the command issuing circuit is configured to:
when it is desired to perform a graphics processing operation for the entirety of the area of a render output that is being generated by the graphics processor:
issue, to the graphics processor, a command to draw a primitive that occupies the entirety of the area of the render output and to perform the graphics processing operation for the primitive that occupies the entirety of the area of the render output, and in response to which command, the graphics processor will determine the vertices for the primitive that occupies the entirety of the area of the render output based on the area of the render output; and
the graphics processor is configured to, in response to a command to draw a primitive that occupies the entirety of the area of the render output and to perform a graphics processing operation for the primitive that occupies the entirety of the area of the render output:
determine the vertices for the primitive that occupies the entirety of the area of the render output based on the area of the render output;
draw the primitive that occupies the entirety of the area of the render output using the vertices determined based on the area of the render output so as to occupy the entirety of the area of the render output;
rasterise the primitive that occupies the entirety of the area of the render output to generate one or more fragments; and
perform the graphics processing operation defined for the command for the one or more fragments generated by rasterising the primitive that occupies the entirety of the area of the render output.

13. The system of claim 12, wherein the command issuing circuit is configured to issue the command to draw the primitive that occupies the entirety of the area of the render output to the graphics processor without writing vertex data associated with the primitive that occupies the entirety of the area of the render output to memory.

14. The system of claim 12, wherein the graphics processing system is a tile-based graphics processing system, the render output is divided into plural rendering tiles for rendering purposes; and the graphics processor comprises a command omitting circuit configured to:
determine whether it is unnecessary to process the command for a rendering tile of the plural rendering tiles that the render output has been divided into; and
when it is determined that processing the command for the rendering tile is unnecessary, cause the graphics processor to omit processing the command for the rendering tile.

15. A tile-based graphics processing system comprising a graphics processor, in which a render output of the graphics processor is divided into plural rendering tiles for rendering purposes; wherein the graphics processor comprises:
a rendering circuit configured to generate each rendering tile by processing graphics processing commands for the respective rendering tile; and
a command omitting circuit configured to, when the graphics processor is generating a rendering tile, in response to a graphics processing command to draw a primitive that occupies the entirety of the area of the render output and to perform a graphics processing operation for the primitive that occupies the entirety of the area of the render output for the rendering tile:
determine whether it is unnecessary to process the graphics processing command to draw a primitive that occupies the entirety of the area of the render output and to perform a graphics processing operation for the primitive that occupies the entirety of the area of the render output for the rendering tile; and
when it is determined that processing the graphics processing command to draw a primitive that occupies the entirety of the area of the render output and to perform a graphics processing operation for the primitive that occupies the entirety of the area of the render output for the rendering tile is unnecessary, cause the rendering circuit of the graphics processor to omit processing the graphics processing command to draw a primitive that occupies the entirety of the area of the render output and to perform a graphics processing operation for the primitive that occupies the entirety of the area of the render output for the rendering tile; and
when it is not determined that processing the graphics processing command to draw a primitive that occupies the entirety of the area of the render output and to perform a graphics processing operation for the primitive that occupies the entirety of the area of the render output for the rendering tile is unnecessary, cause the rendering circuit of the graphics processor to process the graphics processing command to draw a primitive that occupies the entirety of the area of the render output and to perform a graphics processing operation for the primitive that occupies the entirety of the area of the render output for the rendering tile;
wherein the rendering circuit is configured to process the graphics processing command to draw a primitive that occupies the entirety of the area of the render output and to perform a graphics processing operation for the primitive that occupies the entirety of the area of the render output for the rendering tile by:
drawing the primitive that occupies the entirety of the area of the render output;
rasterising the primitive that occupies the entirety of the area of the render output to generate one or more fragments; and
performing the graphics processing operation for the one or more fragments generated by rasterising the primitive that occupies the entirety of the area of the render output.

16. The system of claim 15, wherein the graphics processing operation is an operation that sets each data element corresponding to the entire area of the render output to a respective selected value.

17. The system of claim 16, wherein the graphics processing operation is selected from: (i) a "blitting" operation; (ii) a stencil clear operation; (iii) a depth clear operation; (iv) a background image loading operation; and (v) a filtering operation.

18. The system of claim 16, wherein the command omitting circuit is configured to:
determine whether it is unnecessary to process the graphics processing command for the rendering tile by determining whether a repeated instance of the command is to be processed for the rendering tile, wherein the command and the repeated instance of the command are to be processed for the rendering tile without an intermediate command in response to which the graphics processor will set a data element for the rendering tile to a value other than the respective selected value; and
determine that it is unnecessary to process the graphics processing command for the rendering tile when it is determined that a repeated instance of the command is to be processed for the rendering tile, wherein the command and the repeated instance of the command are to be processed for the rendering tile without an intermediate command in response to which the graphics processor will set a data element for the rendering tile to a value other than the respective selected value.

19. The system of claim 18, wherein:
graphics processing commands to be processed by the graphics processor to generate the render output are arranged into primitive lists representing different sub-regions of the render output;
the graphics processor comprises a primitive list reading circuit which reads the primitive lists to determine the graphics processing commands to be processed for each rendering tile, wherein the primitive list reading circuit comprises the command omitting circuit; and
the primitive list reading circuit is configured to, in response to reading the command in a primitive list for the rendering tile:
determine whether a repeated instance of the command is to be processed for the rendering tile by determining whether the next command to be processed for the rendering tile is a repeated instance of the command; and
when it is determined that the next command to be processed for the rendering tile is a repeated instance of the command, cause the graphics processor to omit processing the command for the rendering tile.

20. The system of claim 18, wherein the graphics processor is further configured to:
when it is determined that processing the command for the rendering tile is unnecessary:
then load configuration data for configuring the graphics processor to perform the graphics processing operation for only a single instance of the command, and process only a single instance of the command according to the read configuration data for the rendering tile.

21. The system of claim 16, wherein:
the command omitting circuit is configured to determine whether it is unnecessary to process the command for the rendering tile by:
  determining whether each data element for the rendering tile is set to the respective selected value; and
  determining that it is unnecessary to process the command for the rendering tile is when it is determined that each data element for the rendering tile is set to the respective selected value.

22. The system of claim 21, wherein:
the graphics processor comprises a rasteriser comprising the command omitting circuit, wherein the rasteriser is configured to determine whether each data element for the rendering tile is set to the respective selected value by testing the primitive that occupies the entirety of the area of the render output against a patch covering the area of the render output being generated.

23. A non-transitory computer readable storage medium storing computer software code which when executing on a processor performs a method of operating a graphics processing system comprising a graphics processor, the method comprising:
  when it is desired to perform a graphics processing operation for the entirety of the area of a render output that is being generated by the graphics processor:
    issuing, to the graphics processor, a command to draw a primitive that occupies the entirety of the area of the render output and to perform the graphics processing operation for the primitive that occupies the entirety of the area of the render output, and in response to which command, the graphics processor will determine the vertices for the primitive that occupies the entirety of the area of the render output from the area of the render output; and
  the graphics processor in response to the command to draw a primitive that occupies the entirety of the area of the render output and to perform the graphics processing operation for the primitive that occupies the entirety of the area of the render output:
    determining the vertices for the primitive that occupies the entirety of the area of the render output based on the area of the render output;
    drawing the primitive that occupies the entirety of the area of the render output using the vertices determined based on the area of the render output so as to occupy the entirety of the area of the render output;
    rasterising the primitive that occupies the entirety of the area of the render output to generate one or more fragments; and
    performing the graphics processing operation defined for the command for the one or more fragments generated by rasterising the primitive that occupies the entirety of the area of the render output.

* * * * *